(12) United States Patent
Nakamoto et al.

(10) Patent No.: US 10,795,343 B2
(45) Date of Patent: Oct. 6, 2020

(54) DATA PROVIDING APPARATUS AND DATA PROVIDING METHOD

(71) Applicant: Hitachi, Ltd., Tokyo (JP)

(72) Inventors: Yoichi Nakamoto, Tokyo (JP); Ryo Hirana, Tokyo (JP); Toshiko Takamura, Tokyo (JP); Daisuke Inaba, Tokyo (JP); Yuichi Igarashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/257,771

(22) Filed: Jan. 25, 2019

(65) Prior Publication Data

US 2019/0235478 A1    Aug. 1, 2019

(30) Foreign Application Priority Data

Jan. 31, 2018   (JP) .................................. 2018-016034

(51) Int. Cl.
*G05B 19/418*       (2006.01)
*G06F 16/903*       (2019.01)
(Continued)

(52) U.S. Cl.
CPC ... *G05B 19/4183* (2013.01); *G05B 19/41865* (2013.01); *G06F 16/2365* (2019.01); *G06F 16/903* (2019.01); *H04L 67/12* (2013.01)

(58) Field of Classification Search
CPC ............... G06F 16/903; G06F 16/2365; G05B 19/41865
See application file for complete search history.

(56) References Cited

U.S. PATENT DOCUMENTS 10,007,513 B2 *   6/2018  Malladi ..................... G06F 8/70
2012/0310599 A1* 12/2012  Tanaka ................. A01B 79/005
                                                             702/189

(Continued)

FOREIGN PATENT DOCUMENTS

JP      2011-215984 A      10/2011
JP      2013-149173 A       8/2013
WO  WO 2017/035536 A1       3/2017

OTHER PUBLICATIONS

Extended European Search Report issued in counterpart European Application No. 19153777.8 dated Apr. 12, 2019 (nine (9) pages).
(Continued)

*Primary Examiner* — Vincent H Tran
(74) *Attorney, Agent, or Firm* — Crowell & Moring LLP

(57) ABSTRACT

A data providing apparatus includes a field data acquisition unit configured to acquire field data relating to field equipment, and a data providing unit configured to transmit and receive information to and from a service providing unit, the service providing unit being a communication target and configured to use the field data as service data, in which the data providing unit manages information on a conversion rule defining a relationship between the field data and the service data, acquires the field data specified in a data acquisition request from the service providing unit, from the field data acquisition unit, converts the acquired field data to service data according to the conversion rule when there is a difference between a specification of the field data and a specification of the service data, and transmits the data obtained by the conversion to the service providing unit.

8 Claims, 15 Drawing Sheets

(51) Int. Cl.
    *H04L 29/08*    (2006.01)
    *G06F 16/23*    (2019.01)

(56) References Cited

U.S. PATENT DOCUMENTS

2015/0222490 A1* 8/2015 Salam ................. H04L 67/2809
                                                    709/224
2016/0314403 A1* 10/2016 Chakraborty ........... G06F 11/00

OTHER PUBLICATIONS

Yodel, M., et al., "A Generic Data Processing Framework for Heterogeneous Sensor-Actor-Networks", Department of Computer Science, Chemnitz University of Technology, International Journal on Advances in Intelligent Systems, Jan. 12, 2012, pp. 483-492, vol. 5, No. 3 & 4, Chemnitz, Germany, XP055576762, (10 pages).

Grace P., et al., "Model-driven interoperability: engineering heterogeneous IoT systems", Annales Des Telecommunications—Annals of Telecommunications, Nov. 25, 2015, pp. 141-150, vol. 71, No. 3, Paris, France, XP035957587, (10 pages).

Cecchinel C. et al., "Automated Deployment of Data Collection Policies over Heterogeneous Shared Sensing Infrastructures", 2013 20$^{th}$ Asia-Pacific Software Engineering Conference, Dec. 7, 2016, pp. 329-336, XP055576787, (nine (9) pages).

Kayastha N. et al., "Smart Grid sensor data collection, communication, and networking: a tutorial", Wireless Communications and Mobile Computing, Jul. 23, 2012, pp. 1055-1087, Oxford, GB, XP055576497, (33 pages).

\* cited by examiner

| DATA NAME | EXPLANATORY INFORMATION CLASSIFICATION | EXPLANATORY INFORMATION | VALID PERIOD | |
|---|---|---|---|---|
| | | | START DATE AND TIME | END DATE AND TIME |
| FIELD SYSTEM (1) SENSOR (1) | TIME GRANULARITY | 100ms | 2017-06-01 00:00:00 | 2017-06-19 10:30:00 |
| FIELD SYSTEM (1) SENSOR (1) | UNIT | K | 2017-06-01 00:00:00 | 2017-06-19 10:30:00 |
| FIELD SYSTEM (1) SENSOR (1) | TIME ACCURACY | LESS THAN ±1ms | 2017-06-01 00:00:00 | 2017-06-19 10:30:00 |
| FIELD SYSTEM (1) SENSOR (2) | TIME GRANULARITY | 100ms | 2017-06-01 00:00:00 | 2017-06-19 10:30:00 |
| FIELD SYSTEM (1) SENSOR (2) | TIME GRANULARITY | 10ms | 2017-06-19 10:30:00 | N/A |
| FIELD SYSTEM (1) SENSOR (2) | UNIT | RPM | 2017-06-01 00:00:00 | N/A |
| FIELD SYSTEM (1) SENSOR (2) | TIME ACCURACY | LESS THAN ±1ms | 2017-06-01 00:00:00 | N/A |
| FIELD SYSTEM (1) SENSOR (3) | TIME GRANULARITY | 10ms | 2017-06-19 10:30:00 | N/A |
| FIELD SYSTEM (1) SENSOR (3) | UNIT | °C | 2017-06-19 10:30:00 | N/A |
| FIELD SYSTEM (1) SENSOR (3) | TIME ACCURACY | LESS THAN ±1ms | 2017-06-19 10:30:00 | N/A |
| FIELD SYSTEM (2) SENSOR (1) | TIME GRANULARITY | 1hr | 2017-06-01 00:00:00 | N/A |
| FIELD SYSTEM (2) SENSOR (1) | UNIT | K | 2017-06-01 00:00:00 | N/A |
| FIELD SYSTEM (2) SENSOR (1) | TIME ACCURACY | LESS THAN ±1min | 2017-06-01 00:00:00 | N/A |
| ... | | | | |

| DATA NAME | EXPLANATORY INFORMATION CLASSIFICATION | EXPLANATORY INFORMATION | VALID PERIOD | |
|---|---|---|---|---|
| | | | START DATE AND TIME | END DATE AND TIME |
| SERVICE A DATA A | TIME GRANULARITY | 1sec | 2017-06-01 00:00:00 | N/A |
| SERVICE A DATA A | UNIT | °C | 2017-06-01 00:00:00 | N/A |
| SERVICE A DATA A | TIME ACCURACY | LESS THAN ±10ms | 2017-06-01 00:00:00 | N/A |
| SERVICE A DATA B | TIME GRANULARITY | SECOND | 2017-06-01 00:00:00 | N/A |
| SERVICE A DATA B | UNIT | RPM | 2017-06-01 00:00:00 | N/A |
| SERVICE A DATA B | TIME ACCURACY | LESS THAN ±0.5s | 2017-06-01 00:00:00 | N/A |
| SERVICE B DATA A | TIME GRANULARITY | HOUR | 2017-06-01 00:00:00 | N/A |
| SERVICE B DATA A | UNIT | °C | 2017-06-01 00:00:00 | N/A |
| SERVICE B DATA A | TIME ACCURACY | LESS THAN ±0min | 2017-06-01 00:00:00 | N/A |
| ... | | | | |

| | 501 | 502 | 503 | 504 | 505 | 506 | |
|---|---|---|---|---|---|---|---|
| | DATA NAME | DATA SOURCE | TIME GRANULARITY CONVERSION RULE | DATA CONVERSION RULE | SHORTAGE RULE | VALID PERIOD | |
| | | | | | | START DATE AND TIME | END DATE AND TIME |
| 507 | SERVICE A DATA A | FIELD SYSTEM (1) SENSOR (1) | NEAREST NEIGHBOR VALUE INTERPOLATION, 50% | UNIT CONVERSION | LINEAR INTERPOLATION, 200% | 2017-06-01 00:00:00 | 2017-06-19 10:30:00 |
| 508 | SERVICE A DATA A | FIELD SYSTEM (1) SENSOR (3) | NEAREST NEIGHBOR VALUE INTERPOLATION, 50% | UNIT CONVERSION | LINEAR INTERPOLATION, 200% | 2017-06-19 10:30:00 | N/A |
| 509 | SERVICE A DATA B | FIELD SYSTEM (1) SENSOR (2) | MOVING AVERAGE INTERPOLATION, 50% | UNIT CONVERSION | LINEAR INTERPOLATION, 200% | 2017-06-01 00:00:00 | N/A |
| 510 | SERVICE B DATA A | FIELD SYSTEM (2) SENSOR (1) | LINEAR INTERPOLATION, 50% | UNIT CONVERSION | PREVIOUS-VALUE INTERPOLATION | 2017-06-01 00:00:00 | N/A |
| 511 | SERVICE B DATA B | FIELD SYSTEM (2) SENSOR (2) | N/A | UNIT CONVERSION | N/A | 2017-06-01 00:00:00 | N/A |
| | ... | ... | | | | | |

DATA PROVIDING APPARATUS AND DATA PROVIDING METHOD

BACKGROUND OF THE INVENTION

1. Field of the Invention

The present invention relates to a data providing apparatus and a data providing method.

2. Description of the Related Art

In recent years, for the purpose of providing services utilizing big data, for example, data management systems capable of collectively managing data collected from factory equipment, field devices, or the like (hereinafter, referred to as field data) have been provided.

Visualizing the amount of electric power measured in a factory or acquiring an operation rate from the number of products per line shall be referred to as "service". Such service is provided to a user by, for example, a service device including a Web server.

The service device manages field data having different types or structures, in association with explanatory information representing, for example, the meaning or reading of the field data to provide a service utilizing the field data for the user.

JP 2013-149173 A discloses "a communication unit 101 communicates with a plurality of terminal devices (systems) via a network 30. A storage unit 102 stores a conversion definition file 1022 in which conversion contents for converting a query issued from a terminal device into a query corresponding to the specification of a product management DB 1021 are defined for each system. Upon receiving a query from a terminal device, a query conversion unit 1031 acquires a conversion content corresponding to the system from the conversion definition file 1022, and converts the received query on the basis of the acquired conversion content. Then, the query conversion unit 1031 supplies the converted query to a DBMS processing unit 1032" (see ABSTRACT).

SUMMARY OF THE INVENTION

In a case where the field data is used, when a service is highly related to a field system for collecting the field data acquired from a factory or a field of production equipment are highly related to each other, the technique disclosed in JP 2013-149173 A enables efficient use of the field data.

In recent years, not only in one organization but also in services not highly related to the field system, use of the field data for data analysis or the like has been spread.

In the technique disclosed in JP 2013-149173 A, the query conversion is performed to read and write information in an old layout of a terminal device having a different table layout, to and from a common database.

The common database of JP 2013-149173 A represents a technology that can be applied to a field only when processing can be completed only by communication with a database of a mission-critical system or the like located in a layer higher than the common database.

However, in the industrial fields, when integrally using a plurality of field data sets, it is necessary to acquire the field data from a plurality of field systems, taking into consideration of a difference in the granularity, data collection frequency, data amount, or the like of each field data set such as time information. Since a plurality of services and systems located higher than the field systems acquire data from the plurality of field systems, it is difficult for the services or the like to exchange data with the field systems by using a common database.

Furthermore, in a field system, a sensor or the like for acquiring field data may be sometimes changed due to replacement, resulting in a change in data collection frequency, data amount, or the like before and after the replacement. When a specification of data (data granularity or the like) of the field system is changed, the services need to be changed according to the specification of the field data, but the necessity is not taken into consideration in the technology of JP 2013-149173 A.

In other words, when a specification of the field data is different from a specification (data granularity etc.) of the field data required from a service, application software (hereinafter, referred to as a service application) providing the service converts the field data to data matching the specification required from the service.

However, every time a specification of a device in the field changes due to replacement, a specification of the field data is changed, requiring modification of the service application in response to the change of the field data.

As described above, in recent data integration environments, change of devices in a plurality of fields influence a plurality of services, and it is necessary for an administrator of the service device to always pay attention to the change of a device in each field. As a result, there is a problem that the change of the field system causes an increase in man-hours for revision of the service application.

The present invention has been made in view of the above problem, and it is an object of the present invention to propose a data providing apparatus and a data providing method which provide service data matching a request from a data requestor to the data requestor to reduce man-hours for revision in a service application.

In order to solve such a problem, the present invention includes a field data acquisition unit configured to acquire field data relating to field equipment, and a data providing unit having a service providing unit, as a communication target, configured to use the field data as service data, the data providing unit transmitting and receiving information to and from the communication target, in which the data providing unit manages information on a conversion rule defining a relationship between the field data and the service data, acquires the field data specified in a data acquisition request from the service providing unit, from the field data acquisition unit, compares a specification of the field data acquired with a specification of the service data, converts the acquired field data according to the conversion rule when there is a difference between the compared specification of the field data and specification of the service data, and transmits the converted field data to the service providing unit.

According to the present invention, it is possible to achieve a data providing apparatus and a data providing method which provide service data matching a request made by a data requestor to the data requestor to reduce man-hours for revision in a service application.

BRIEF DESCRIPTION OF THE DRAWINGS

FIG. 3 is a conceptual diagram illustrating a configuration of a field data explanatory information management table according to an embodiment of the present invention;

FIG. 4 is a conceptual diagram illustrating a configuration of a service data explanatory information management table according to an embodiment of the present invention;

FIG. 5 is a conceptual diagram illustrating a configuration of a conversion rule management table according to an embodiment of the present invention;

DESCRIPTION OF THE PREFERRED EMBODIMENTS

Figure 1:
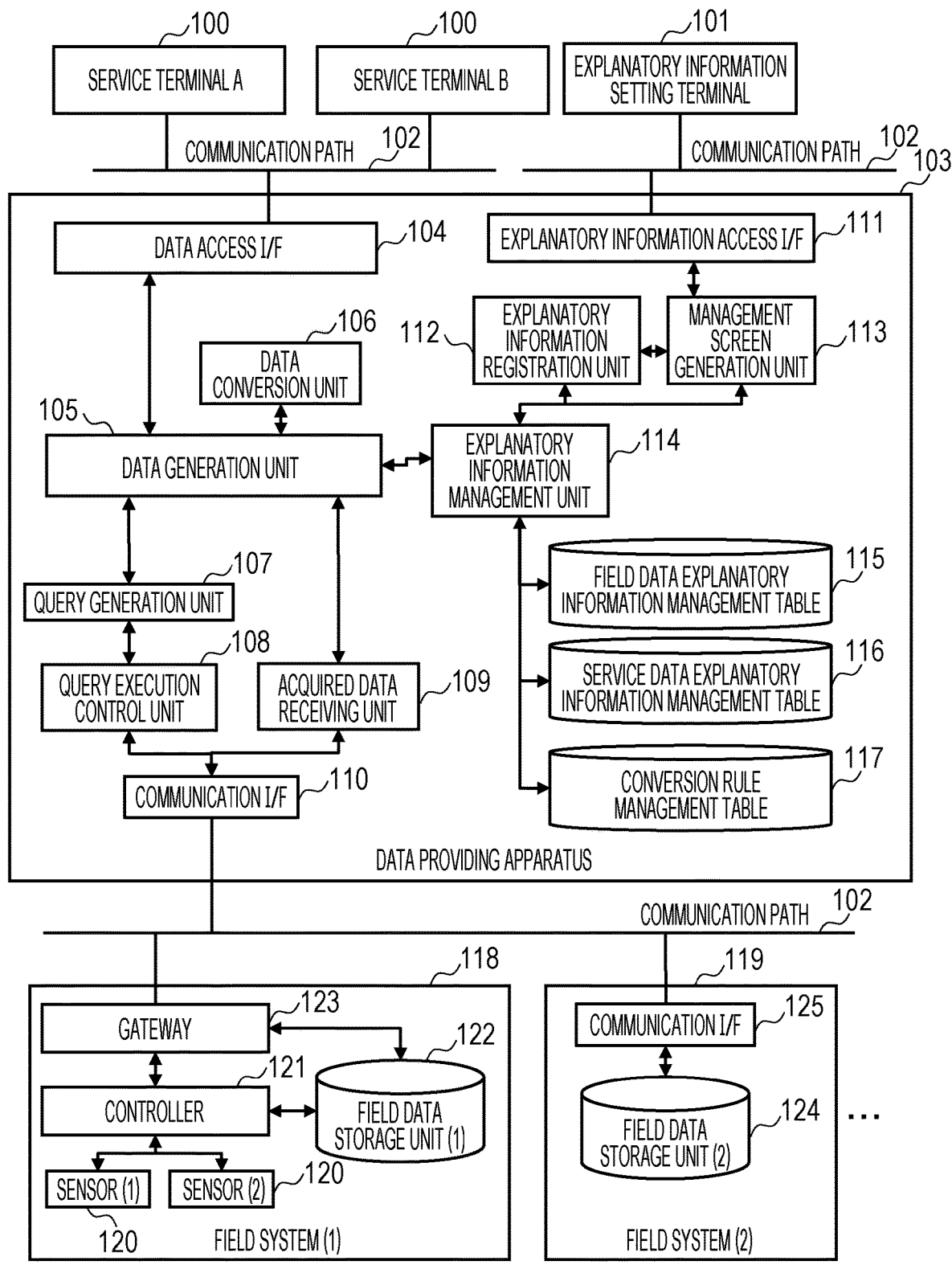
FIG. 1 is a block diagram illustrating the overall configuration of a data integration system according to an embodiment of the present invention.

The present invention is preferably applied to a data integration system that acquires field data from a field such as a factory production line and provides a service using the acquired field data.

Hereinafter, embodiments of the present invention will be described with reference to the drawings. A configuration of the data integration system will be described with reference to FIGS. 1 to 10, and processes of registering explanatory information and a data conversion rule in the data integration system will be described with reference to FIGS. 11 to 15.

Furthermore, referring to FIG. 15, a description will be made of a process in which a data providing apparatus acquires field data in response to a service data request from a service terminal being a data requestor, and provides, to the service terminal, service data obtained by performing data conversion of the acquired field data, in the data integration system.

Incidentally, in the present specification and the drawings, the same reference numerals are given to component elements having substantially the same functions or configurations, and redundant explanation thereof will be omitted.

Component elements and reference numerals having been already described in the specification may be also used in a description using another drawing, but the description will be made unless otherwise noted.

FIG. 1 is a block diagram illustrating the overall configuration of the data integration system according to an embodiment of the present invention. The data integration system includes a plurality of service terminals 100, an explanatory information setting terminal 101, a data providing apparatus 103, a field system (1) 118, and a field system (2) 119. The service terminals 100 and the data providing apparatus 103 are connected to each other via a communication path 102 so as to be capable of communicating data to each other. For the communication path 102, for example, a local network in an organization, the Internet, or the like is used. Likewise, the data providing apparatus 103 are connected to the explanatory information setting terminal 101 via the same or different communication path 102, and further, the data providing apparatus 103 are connected to the field system (1) 118 and the field system (2) 119 via the same or different communication path 102.

Each of the service terminals 100 is a service providing unit, a data requestor, or a service provider using data (field data) of the field system (1) 118 or the field system (2) 119 as service data to provide a service to an end user or another device, and includes, for example, a computer device having information processing resources, such as a central processing unit (CPU), a memory, and an input/output interface.

In the memory, a service application to be executed by the CPU is stored. For example, each service terminal 100 is provided for each service, such as a service A or a service B. In FIG. 1, a service terminal 100 configured to provide the service A to the end user is represented as a "service terminal A".

In the following description, when the services A and B are not distinguished from each other, the services A and B are collectively referred to as "service". Each service terminal 100 transmits a service data request to the data providing apparatus 103 via the communication path 102, and acquires, from the data providing apparatus 103, data (service data) necessary for a service. A detailed process of this data acquisition will be described later with reference to FIG. 15. The data necessary for a service means a predetermined field data used to provide a calculation result as service information by a service application or data obtained by processing the predetermined field data.

The explanatory information setting terminal 101 is an explanatory information setting unit for management of various settings/modifications made on field data explanatory information, service data explanatory information, and a conversion rule held by the data providing apparatus 103, and includes, for example, a computer device having a CPU, a memory, an input/output interface, an input unit (mouse, keyboard), a display unit (liquid crystal display), and the like. The field data explanatory information is various information that explains field data, such as data type, data accuracy, unit, usage, and the like of the field data held by the field system (1) 118 and the field system (2) 119. The service data explanatory information is various information that explains service data, such as data type, accuracy, unit, usage, and the like of the service data requested by each service terminal 100 from the data providing apparatus 103. The conversion rule is information indicating how to generate service data from field data. This conversion rule includes, for example, one-to-one or one-to-N relationship information between service data and field data from which the service data is generated, an interpolation method in data interpolation such as previous-value interpolation or linear interpolation, a conversion rule in data conversion such as an average value or a correlation value, or the like.

The data providing apparatus 103 is an apparatus for acquiring field data necessary for generating service data, from the field system (1) 118 or the field system (2) 119, based on a service data request (including data acquisition request) from each service terminal 100, and performing necessary data conversion on the acquired field data to provide service data obtained by the data conversion to the service terminal 100. The data providing apparatus 103 includes a data access interface (I/F) 104, a data generation unit 105, a data conversion unit 106, a query generation unit 107, a query execution control unit 108, an acquired data receiving unit 109, a communication I/F 110, an explanatory information access I/F 111, an explanatory information registration unit 112, a management screen generation unit 113, an explanatory information management unit 114, a field data explanatory information management table 115, a service data explanatory information management table 116, and a conversion rule management table 117.

The data access I/F 104 provides an interface for a service data request (data acquisition request) from the service terminal 100 and data provision to the service terminal 100, and includes, for example, REST Web API. The data generation unit 105 is a functional block for generating service data based on a service data request (data acquisition request) from the service terminal 100. Specifically, the data generation unit 105 refers to information in the conversion rule management table 117 via the explanatory information management unit 114, issues a query generation request to the query generation unit 107 to acquire necessary field data, acquires field data from the field system (1) 118 or the field system (2) 119 via the acquired data receiving unit 109, and instructs the data conversion unit 106 to perform data conversion processing on the acquired field data. These detailed processes will be described with reference to FIG. 15.

The data conversion unit 106 is a functional block for performing data conversion in response to a data conversion request from the data generation unit 105. The query generation unit 107 is a functional block for generating a query for acquiring field data from the field system (1) 118 and the field system (2) 119, in response to a query generation request from the data generation unit 105, and instructs the query execution control unit 108 to execute the generated query. The query execution control unit 108 is a functional block for issuing a query to the field system (1) 118 or the field system (2) 119 via the communication I/F 110, according to the query instruction from the query generation unit 107. The acquired data receiving unit 109 is a functional block for receiving field data as a response from the field system (1) 118 or the field system (2) 119 to the query issued by the query execution control unit 108, via the communication I/F 110, and passing the field data to the data generation unit 105. The communication I/F 110 provides an interface function for communication with the field system (1) 118 and the field system (2) 119 via the communication path 102.

The explanatory information access I/F 111 provides an interface for various requests (registration, change, deletion, etc.) from the explanatory information setting terminal 101 and information provision to the explanatory information setting terminal 101, and includes, for example, REST Web API. The explanatory information registration unit 112 is a functional block for registering, changing, and deleting information of various management tables 115 to 117 in response to requests for registration, change, and deletion of various explanatory information received from the explanatory information setting terminal 101. The management screen generation unit 113 is a functional block for acquiring information of various management tables 115 to 117 in response to an explanatory information management screen request from the explanatory information setting terminal 101, and generates an explanatory information management screen. The explanatory information management unit 114 is a functional block for managing the various management tables 115 to 117, and performing new data registration, data change, data deletion, or the like for various management tables 115 to 117, in response to a request from the data generation unit 105 or the explanatory information registration unit 112.

The field data explanatory information management table 115 is a table for managing the above-described field data explanatory information, and a detailed description of a table configuration thereof will be made later with reference to FIG. 3. The service data explanatory information management table 116 is a table for managing the above-described service data explanatory information, and a detailed description of a table configuration thereof will be made later with reference to FIG. 4. The conversion rule management table 117 is a table for managing the above-described conversion rules, and a detailed description of a table configuration thereof will be made later with reference to FIG. 5.

The field system (1) 118 includes a gateway 123 for connecting the data providing apparatus 103 and the field system (1) 118, sensors 120 for sensing the field system (1) 118, a controller 121 for controlling these sensors, and a field data storage unit (1) 122 for accumulating field data sensed by the sensors 120.

In a case where the field system (1) 118 includes, for example, a power plant system, the sensors 120 include a rotation speed sensor for detecting the rotation speed of a gas turbine, a temperature sensor for detecting the temperature of the turbine, and the like.

At this time, the sensors 120 measure equipment and devices, each of which is an object to be measured, in accordance with specifications defined for the respective objects to be measured, and output measurement result data as field data. The equipment and devices are equipment and devices used in an industrial field, and include, for example, machine tools, belt conveyors, motors, inverters, compressors, automatic transport robots, temperature sensors, flow sensors, and the like, which are hereinafter collectively simply referred to as equipment.

In addition, when a specification of each object to be measured is changed in response to changing the equipment, field data measured by each sensor 120 is also changed according to the specification of the object to be measured. For example, when a unit of the specification of the temperature sensor of the sensors 120 is changed from "K" to "° C.", the value of the field data measured by the temperature sensor also changes from "K" to "° C.".

The field system (1) 118 is a field data acquisition unit for acquiring data measured by the sensor 120 as the field data, or a field data collection unit for collecting the measured data as the field data.

The field system (2) 119 includes a communication I/F 125 for exchanging data over the communication path 102 connecting the data providing apparatus 103 and the field system (2) 119, and a field data storage unit (2) 124 being an existing database, such as a manufacturing execution system (MES) or a distributed control system (DCS), for accumulating data collected to control a production plan or the like of the field system (2) 119.

In each of the field data storage unit (1) 122 and the field data storage unit (2) 124, a field table for managing field data in association with each field system and each sensor is stored.

Figure 2:
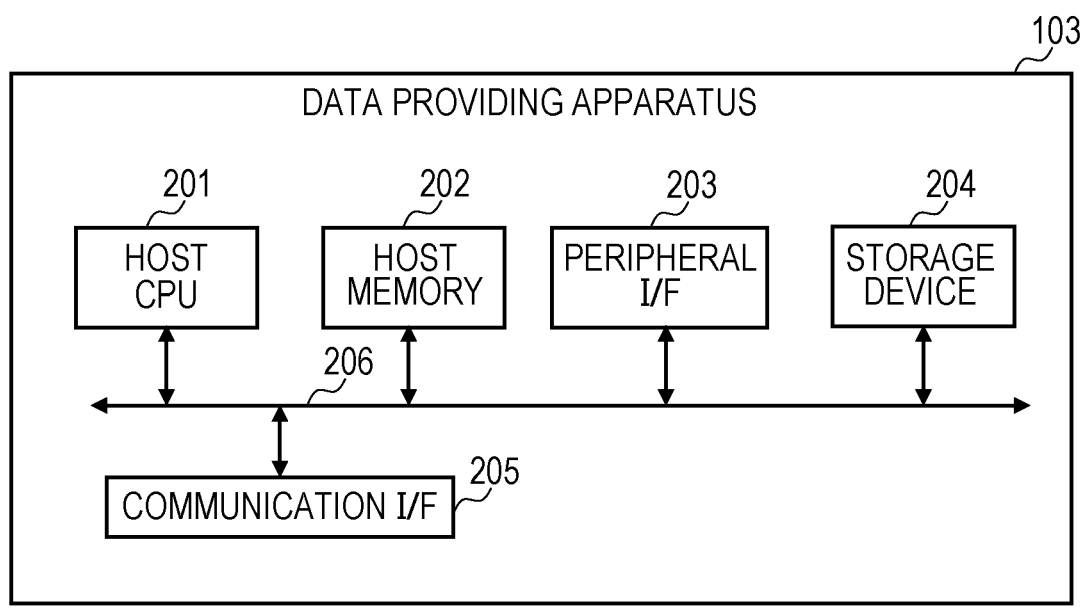
FIG. 2 is a block diagram illustrating a logical configuration of a data providing apparatus according to an embodiment of the present invention.

Next, a hardware configuration of the data providing apparatus 103 will be described with reference to FIG. 2. FIG. 2 is a block diagram illustrating a logical configuration of the data providing apparatus 103 according to an embodiment of the present invention. The data providing apparatus 103 includes a host CPU 201 for performing various processes, a host memory 202, a peripheral I/F 203, a storage device 204, a communication I/F 205, and a bus 206. The host CPU 201, the host memory 202, the peripheral I/F 203, the storage device 204, and the communication I/F 205 are connected to each other via the bus 206 and are configured to exchange information with each other.

The host CPU 201 is an arithmetic device for executing a program held in the storage device 204, integrally controls the whole of the data providing apparatus 103, and further transmits and receives information to and from the service terminal 100, the explanatory information setting terminal 101, the field system (1) 118, and the field system (2) 119 as communication targets. The host memory 202 is a volatile storage device used as a working memory and a temporary buffer for input/output data when the host CPU 201 executes the program. The peripheral I/F 203 is an interface for connecting an input/output device, such as a mouse, a keyboard, or a monitor, or various peripheral devices, such as an external storage including a Universal Serial Bus (USB) memory, to the data providing apparatus 103.

Furthermore, the storage device 204 includes a magnetic disk device, a flash read only memory (ROM), or the like, and stores various information (e.g., information and the like set by an administrator or a maintainer) used for an operating system (OS), various drivers, various application programs, and programs.

The communication I/F 205 provides an interface used when the data providing apparatus 103 communicates with a service terminal 100, the explanatory information setting terminal 101, the field system (1) 118, or the field system (2) 119 via the communication path 102. Two or more communication I/Fs 205 may be provided.

Next, the information stored in the various management tables 115 to 117 of the data providing apparatus 103 will be described with reference to FIGS. 3 to 5.

FIG. 3 is a conceptual diagram illustrating a table configuration of the field data explanatory information management table 115 according to an embodiment of the present invention. The field data explanatory information management table 115 stores information on data name 301, explanatory information classification 302, explanatory information 303, and valid period 304. The field data explanatory information management table 115 is a table for managing first identification information (the data name 301) for identifying the field data and first specification information (the explanatory information classification 302, the explanatory information 303) relating to the specification of the field data, in association with a valid period 304 of the first identification information and the first specification information.

A column of the data names 301 stores data names of fields (field data name) for uniquely identifying all field data, for example, storing information (ID, name, etc.), such as the sensor (1) operating in the field system (1), for identifying each field system and each sensor.

A column of the explanatory information classifications 302 stores classification information for classifying the explanatory information on the field data, for example, storing "time granularity" representing a period of periodic data, "unit" representing the unit of data, and the like. A column of the explanatory information 303 stores the explanatory information on the field data, for example, storing "100 ms" indicating the value of time granularity, "K" indicating the unit (Kelvin) of the field data (temperature), and the like. A column of the valid period 304 stores start date and time at which the explanatory information on a corresponding record is valid and end date and time.

For example, a record in row 305 represents that "time granularity" of data measured by the sensor (1) on the field system (1) during a period from "2017-06-01 00: 00: 00" to "2017-06-19 10: 30: 00" is "100 ms", that is, the record is periodic data acquired every "100 ms".

Similarly, a record in row 306 represents that "unit" of data measured by the sensor (1) of the field system (1) during a period from "2017-06-01 00: 00: 00" to "2017-06-19 10: 30: 00" is "K".

Similarly, a record in row 307 represents that "time accuracy" of data measured by the sensor (1) of the field system (1) during a period from "2017-06-01 00: 00: 00" to "2017-06-19 10: 30: 00" is "less than ±1 ms".

The explanatory information classification 302 and the explanatory information 303, and the information (time information including year, month, day, and time) stored during the valid period 304 are used as information for identifying the version of the field data explanatory information management table 115. For example, row 308 and row 309 have the same information in the "time granularity" which is the information on the explanatory information classification 302, but have different information in the explanatory information 303 and the valid period 304. In this case, the field data measured by a sensor (2) of the field system (1) is changed from "100 ms" to "10 ms" in time granularity as the equipment is changed, and the information in row 308 is information of older version or information corresponding to older equipment relative to the information in row 309.

FIG. 4 is a conceptual diagram illustrating a table configuration of the service data explanatory information management table 116 according to an embodiment of the present invention. The service data explanatory information management table 116 stores information on data name 401, explanatory information classification 402, explanatory information 403, and valid period 404.

The service data explanatory information management table 116 is configured as a table for managing second identification information (the data name 401) for identifying the service data and second specification information (the explanatory information classification 402, the explanatory information 403) relating to the specification of the service data, in association with a valid period 404 of the second identification information and the second specification information.

A column of the data name 401 stores data name for uniquely identifying all service data, for example, storing information (ID, name, etc.), such as data A used for the service A, for identifying respective service data. The explanatory information classification 402, the explanatory information 403 and the valid period 404 are the same as the explanatory information classification 302, the explanatory information 303 and the valid period 304 of FIG. 3, and the description thereof will be omitted.

For example, a record in row 405 represents that the time granularity of the data A requested by the service A after "2017-06-01 00: 00: 00" is "1 sec". A record in row 406 represents that the unit of the data A requested by the service A after "2017-06-01 00: 00: 00" is "° C.". A record in row 407 represents that the time granularity of the data A requested by the service A after "2017-06-01 00: 00: 00" is "less than ±10 ms". Furthermore, a record in row 408 represents that the time granularity of data B requested by the service A after "2017-06-01 00: 00: 00" is "second". A record in row 409 represents that the unit of the data B requested by the service A after "2017-06-01 00: 00: 00" is "RPM".

FIG. 5 is a conceptual diagram illustrating a table configuration of the conversion rule management table 117 according to an embodiment of the present invention. The conversion rule management table 117 stores information on data name 501, data source 502, time granularity conversion rule 503, data conversion rule 504, shortage rule 505, and valid period 506.

The conversion rule management table 117 stores third identification information (data source 502) for identifying the field data, that is, indicating whether which equipment is a data provider, and fourth identification information (data name 501), in association with each other. In addition, the conversion rule management table 117 manages conversion rules (time granularity conversion rule 503, data conversion rule 504, and shortage rule 505) in association with valid periods 506 of the conversion rules.

A column of the data name 501 stores data name for identifying the service data, as data name for uniquely identifying data after conversion. A column of the data source 502 stores data name for identifying a measurement source of the field data as data name for uniquely identifying original data before conversion. Although only one data source is indicated here for simplicity, a plurality of data sources may be specified. A column of the time granularity conversion rule 503 stores conversion rule applied when the time granularity of data of the data source 502 is converted (resampled) to the time granularity of data of the data name 501. A column of the data conversion rule 504 stores data conversion rule applied when a data value of data of the data source 502 (data value of the field data) is converted to a data value of data of the data name 501 (data value of the service data). FIG. 5 shows an example using the unit conversion as a representative example.

Although the "unit conversion" is described as a representative example in the data conversion rule 504, the data conversion rule 504 is not limited thereto and may use scale conversion, various arithmetic operations, any other conversion function, or the like.

A column of the shortage rule 505 stores information on an interpolation rule applied when there is no data about the data source 502 or when the data of the data name 501 is insufficient as a result of time granularity conversion or data conversion.

A column of the valid period 506 stores valid periods of conversion rules stored, and the conversion rules (the time granularity conversion rule 503, the data conversion rule 504, the shortage rule 505) are applied only to data within the valid periods.

Specifically, row 507 will be described as an example. Row 507 represents conversion rules for converting the data of "field system (1) sensor (1)" into the data of "service A data A". The explanatory information of each data set is as illustrated in FIGS. 3 and 4.

In addition, the time granularity of field system (1) sensor (1) is 100 msec, while the time granularity of the data A requested by the service A is 1 sec, indicating that conversion (resampling) is to be performed for the time granularity.

Here, as the time granularity conversion rule 503, "nearest neighbor, 50%" is performed, that is, the data of "service A data A" is interpolated using the data of "field system (1) sensor (1)" having a timestamp closest to reference time (00: 00: 00.000, 00: 00: 01.000, 00: 00: 02.000, ...) with a cycle of one second of the service A data A.

"50%" represents a range of data of "field system (1) sensor (1)" being an interpolation candidate. In this case, interpolation is performed with the range of ±50% of the cycle of "service A data A", that is, with a nearest neighbor value of "field system (1) sensor (1)" within ±500 msec of the reference time.

Furthermore, when there is no data of "field system (1) sensor (1)" within ±500 msec, the data of "service A data A" at the reference time is treated as a missing value, and an interpolation process is performed later based on the shortage rule 505.

Since "unit conversion" is specified as the data conversion rule 504, the unit "K" of the "field system (1) sensor (1)" is converted to the unit "° C." of the "service A data A". That is, a value obtained by subtracting "273.15" from the data value of "field system (1) sensor (1)" is set to "service A data A". In addition, since "linear interpolation, 200%" is specified as the shortage rule 505, when no data is available for the "service A data A" at a certain reference time, interpolation is performed with the data of "service A data A" within the range of 200% of the cycle, that is, within ±2 sec of the cycle. These conversion rules (the time granularity conversion rule 503, the data conversion rule 504, and the shortage rule 505) are applied to data in a period from "2017-06-01 00: 00: 00" to "2017-06-19 10: 30: 00", and for data in the other periods, conversion is performed based on another valid conversion rule.

Furthermore, row 507 and row 508 have the same information, which is "service A data A", in the data name 501, but row 507 and row 508 have different information, which is "field system (1) sensor (1)" and "field system (1) sensor (3)", in the data source 502, and also have different information in the valid period 506. This indicates that the information on the data source 502 corresponding to "service A data A" is changed as the version is changed due to changing equipment.

In this case, the information in row 507 is information on older version relative to the information in row 508. The information of row 509, row 510, and row 511 are information of the same version. In other words, the conversion rule management table 117 stores information of each version of a conversion rule applied to various service data. In other words, the respective versions of the conversion rules are conversion rule information corresponding to change histories of the equipment.

Figure 6:
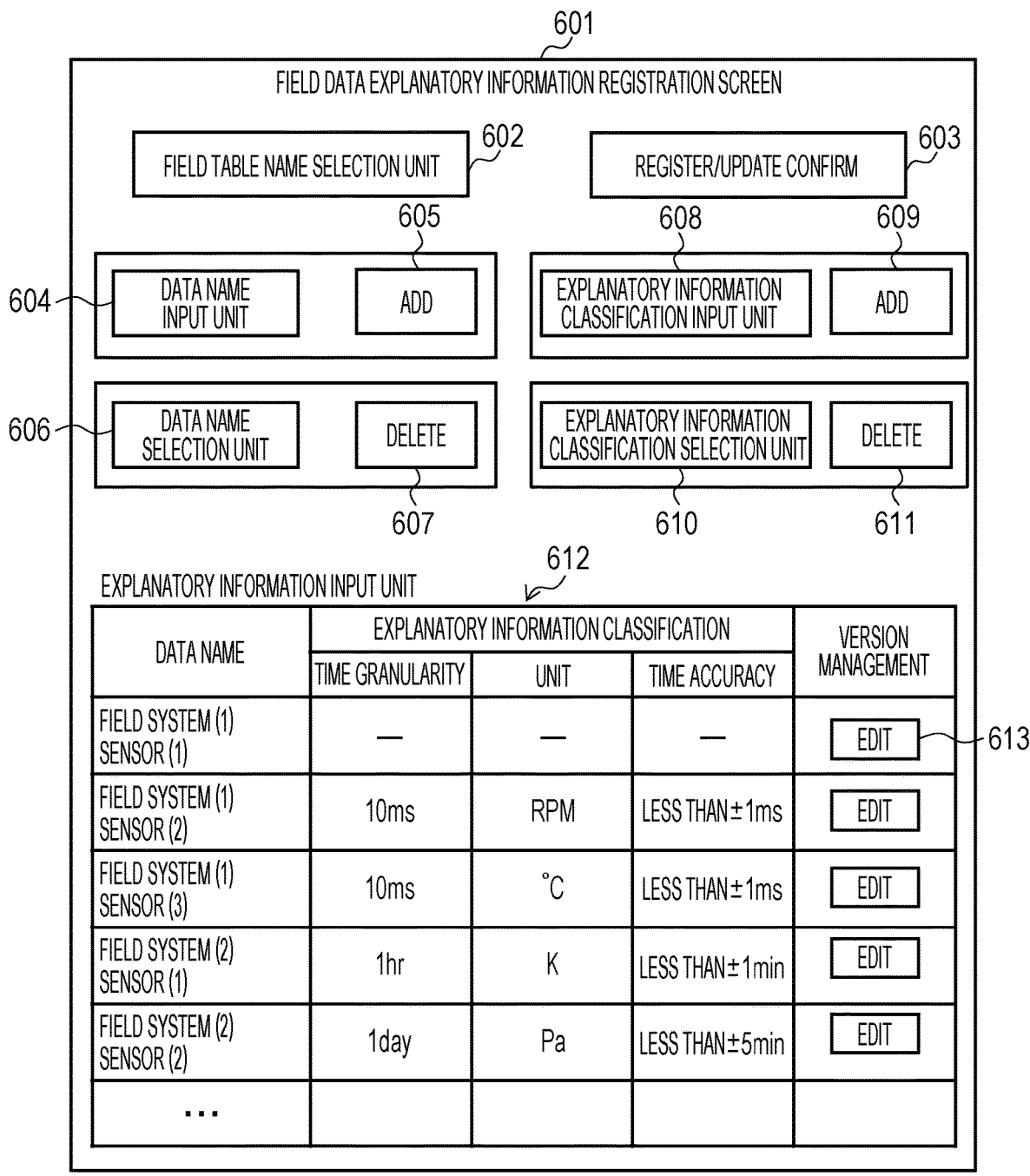
FIG. 6 is a conceptual diagram illustrating a configuration of a field data explanatory information registration screen according to an embodiment of the present invention.

Next, management screens for the explanatory information setting terminal 101 to manage various explanatory information and conversion rules illustrated in FIGS. 3 to 5 will be described with reference to FIGS. 6 to 10. FIG. 6 is a conceptual diagram illustrating a configuration of a field data explanatory information registration screen 601 according to an embodiment of the present invention.

FIG. 6 shows the field data explanatory information registration screen 601 which is a user interface (display unit) used by the explanatory information setting terminal 101 to register, change, and delete field data explanatory information.

The field data explanatory information registration screen 601 includes a field table name selection unit 602, a register/update confirm button 603, a data name input unit 604, an add button 605, a data name selection unit 606, a delete button 607, an explanatory information classification input unit 608, an add button 609, an explanatory information classification selection unit 610, a delete button 611, an explanatory information input unit 612, and an edit button 613.

The field table name selection unit 602 is an I/F for selecting a field table in which the explanatory information is to be registered, changed, or deleted. When selecting a field table, direct input may be made for specification or selection may be made from a list of already registered field tables.

The register/update confirm button 603 is an I/F for confirming a result of registration, change, or deletion on the field data explanatory information registration screen 601, and when the register/update confirm button 603 is operated for confirmation, information managed in the various tables 115 to 117 illustrated in FIGS. 3 to 5 is updated.

The data name input unit 604 and the add button 605 are I/Fs used to add new field data as an object, the field data explanatory information of which is to be registered. When a data name is input to the data name input unit 604 and the add button 605 is pressed, a row of the new data name is added to the explanatory information input unit 612.

The data name selection unit 606 and the delete button 607 are I/Fs used to delete a line of the field data displayed in the explanatory information input unit 612. All data names having been registered are displayed in the data name selection unit 606, and when a data name to be deleted is selected in the data name selection unit 606 and the delete button 607 is pressed, a row of the selected field data is deleted from the explanatory information input unit 612.

The explanatory information classification input unit 608 and the add button 609 are I/Fs for adding a new explanatory information classification to the explanatory information input unit 612. Information input from the I/F is added to the explanatory information classification 302 of FIG. 3.

When an explanatory information classification to be added is input to the explanatory information classification input unit 608 and then the add button 609 is pressed, a new column of the explanatory information classification is added to the explanatory information input unit 612. The explanatory information classification selection unit 610 and the delete button 611 are I/Fs for deleting an explanatory information classification from the explanatory information input unit 612.

All explanatory information classifications having been registered are displayed in the explanatory information classification selection unit 610, and when an explanatory information classification to be deleted is selected in the explanatory information classification selection unit 610 and the delete button 611 is pressed, a column of the selected explanatory information classification is deleted from the explanatory information input unit 612. The explanatory information input unit 612 is an I/F for editing explanatory information of various field data having been registered, through which a cell of explanatory information to be edited is selected for direct input to edit the content thereof. The contents of the edited various explanatory information of the field data are reflected in the explanatory information 303 of FIG. 3.

In addition, the versions of the explanatory information are managed, and in an example illustrated in FIG. 6, explanatory information of the latest version currently effectively used is displayed. The explanatory information of the latest version is explanatory information corresponding to a sensor or the like connected or attached to a current field system.

To refer to or edit explanatory information of an older version, pressing an edit button 613 corresponding to each data name in a column of the version management displays reference/edit information. The user performs various operations on the field data explanatory information version management screen 701 of FIG. 7, which will be described later.

Figure 7:
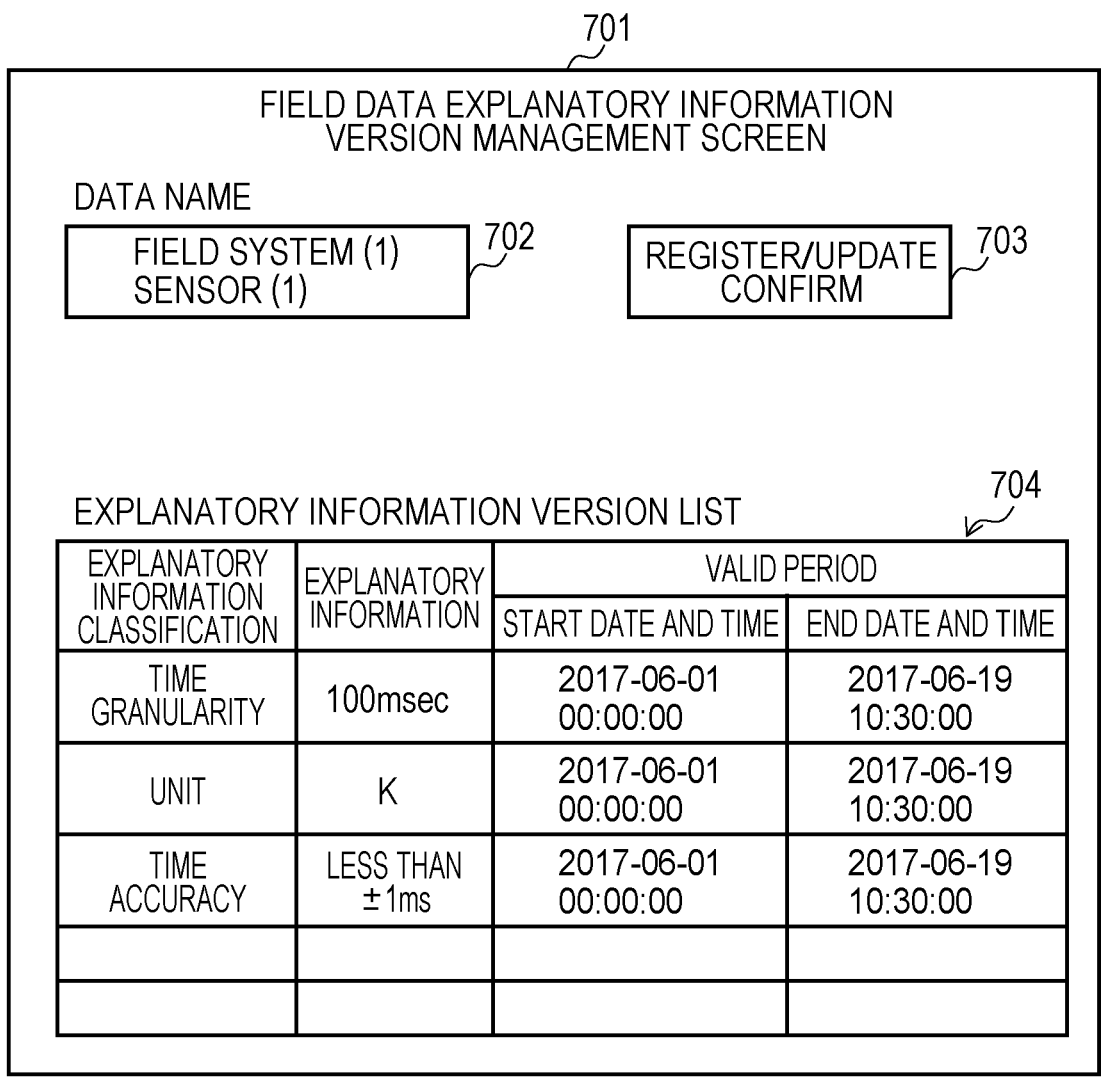
FIG. 7 is a conceptual diagram illustrating a configuration of a field data explanatory information version management screen according to an embodiment of the present invention.

FIG. 7 is a conceptual diagram illustrating a configuration of a field data explanatory information version management screen 701 according to an embodiment of the present invention. This field data explanatory information version management screen 701 is a user interface (display unit) used by the explanatory information setting terminal 101 for version management of the field data explanatory information.

This field data explanatory information version management screen 701 includes a data name selection area 702, a register/update confirm button 703, and an explanatory information version list 704. The data name selection area 702 displays a field data name selected by pressing an edit button 613 in FIG. 6, and the explanatory information version list 704 displays a list of older, current, and future explanatory information on a field data name displayed in the data name selection area 702.

The user directly edits the explanatory information classification, the explanatory information, and the valid period on the explanatory information version list 704 and presses the register/update confirm button 703, confirming the editing content, that is, updating various information (the explanatory information classification 302, the explanatory information 303, and the valid period 304 in FIG. 3) managed in the field data explanatory information management table 115.

If the user desires to perform version management of the explanatory information of other field data, selecting another field data name in the data name selection area 702 displays the explanatory information of the selected field data in the explanatory information version list 704.

Figure 8:
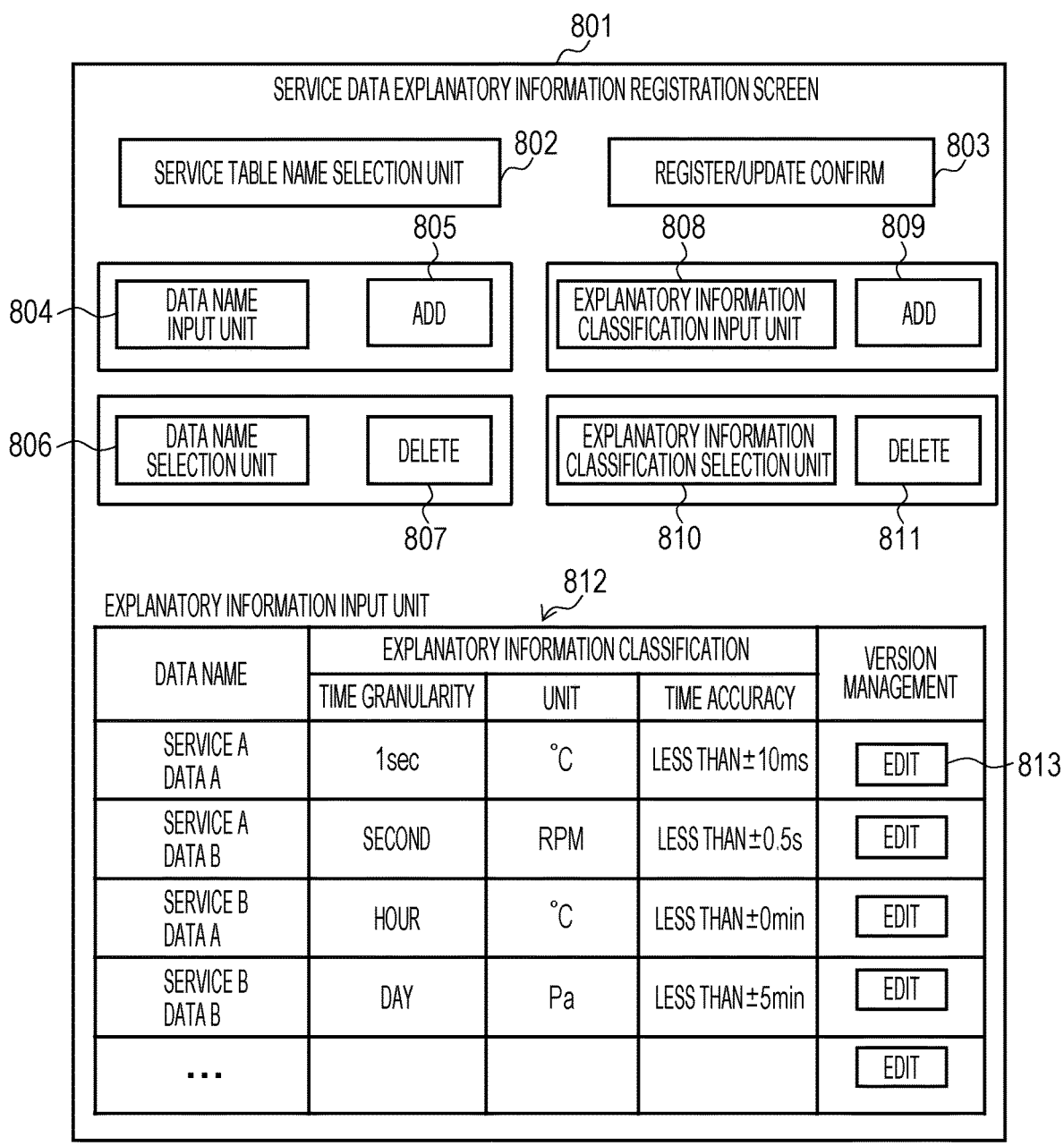
FIG. 8 is a conceptual diagram illustrating a configuration of a service data explanatory information registration screen according to an embodiment of the present invention.

FIG. 8 is a conceptual diagram illustrating a configuration of a service data explanatory information registration screen 801 according to an embodiment of the present invention. This service data explanatory information registration screen 801 is a user interface (display unit) used by the explanatory information setting terminal 101 to register, change, or delete service data explanatory information.

The service data explanatory information registration screen 801 includes a service table name selection unit 802, a register/update confirm button 803, a data name input unit 804, an add button 805, a data name selection unit 806, a delete button 807, an explanatory information classification input unit 808, an add button 809, an explanatory information classification selection unit 810, a delete button 811, an explanatory information input unit 812, and an edit button 813.

This service data explanatory information registration screen 801 is the same as the field data explanatory information registration screen 601 of FIG. 6 except for the field data, which is replaced with the service data, and the description thereof will be omitted. That is, instead of selecting a "field table name" in the field data explanatory information registration screen 601 of FIG. 6 and registering "field data" or the like, a "service table name" is selected and "service data" or the like is registered in the service data explanatory information registration screen 801.

The service table name is a name of a table for managing service data, but it is possible to manage the service data with a service data name without using the service table name.

Figure 9:
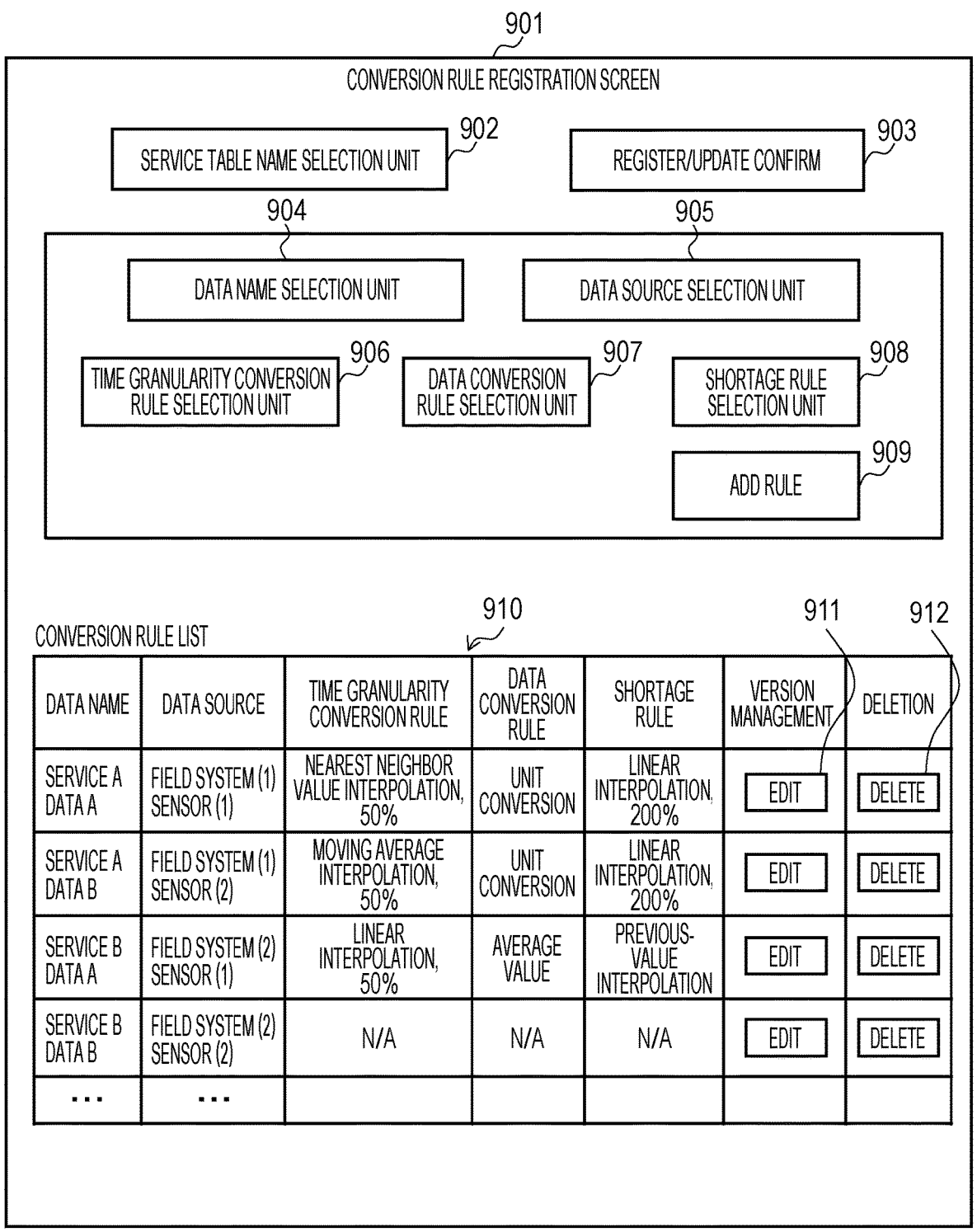
FIG. 9 is a conceptual diagram illustrating a configuration of a conversion rule registration screen according to an embodiment of the present invention.

FIG. 9 is a conceptual diagram illustrating a configuration of a conversion rule registration screen 901 according to an embodiment of the present invention. This conversion rule registration screen 901 is a user interface (display unit) used by the explanatory information setting terminal 101 to register, change, and delete a conversion rule for generating service data from a data source such as field data.

The conversion rule registration screen 901 includes a service table name selection unit 902, a register/update confirm button 903, a data name selection unit 904, a data source selection unit 905, a time granularity conversion rule selection unit 906, a data conversion rule selection unit 907, a shortage rule selection unit 908, an add rule button 909, a conversion rule list 910, an edit button 911, and a delete button 912.

The service table name selection unit 902 is an I/F for specifying a table of service data to which a conversion rule is to be registered. When the service table name is specified through this I/F, a conversion rule list related to the service table is displayed in the conversion rule list 910.

The register/update confirm button 903 is an I/F for confirming a result of registration, change, or deletion on the conversion rule registration screen 901, and when the register/update confirm button 903 is operated to confirm the result, information managed in the conversion rule management table 117 of FIG. 5 is updated.

The data name selection unit 904 is an I/F for selecting a service data name for which a conversion rule is to be set, and a data name list of the service table specified in the service table name selection unit 902 is displayed.

The data source selection unit 905 is an I/F for specifying original data for generating the service data selected in the data name selection unit 904. In an example of this conversion rule registration screen 901, the data source selection unit 905 is an I/F for selecting one single data source.

In addition to this, a plurality of data sources may be selected, for example, an average value of the field data A and B is determined as service data C. In addition, when specifying a data source, field data may be specified or service data different from service data specified in the data name selection unit 904 may be specified.

The time granularity conversion rule selection unit 906 is an I/F for specifying how to convert time granularity when a time granularity (sampling rate) of the service data specified by the data name selection unit 904 is different from a time granularity of a data source specified by the data source selection unit 905.

The data conversion rule selection unit 907 is an I/F for specifying which data conversion is applied to a value of a data source specified by the data source selection unit 905 to generate a value of the service data specified in the data name selection unit 904.

As a simple example, there are unit conversion and simple average (of a plurality of data sources), but a complicated conversion rule may be specified by using JavaScript (R) Object Notation (JSON) (registered trademark) format, Extensible Markup Language (XML) (registered trademark) format, or the like.

The shortage rule selection unit 908 is an I/F for specifying how to interpolate the shortage of data of a data source caused by some reason of, for example, insufficient data, and the interpolation includes previous-value interpolation, linear interpolation, or the like.

The add rule button 909 is an I/F for adding, as a new conversion rule, a content specified by the data name selection unit 904 to the shortage rule selection unit 908, and by pressing the I/F, information added to the conversion rule list 910 is displayed.

The conversion rule list 910 is an I/F for displaying a list of conversion rules relating to a service table specified in the service table name selection unit 902 or editing the list of conversion rules. By selecting a cell of a conversion rule to be edited to make a direct input, a content having been input is edited, and the edited content is displayed in the conversion rule list 910.

In addition, the versions of the conversion rules are managed, and in this example, a conversion rule of the latest effective version is displayed. That is, even when a specification of equipment is changed, a conversion rule of the latest effective version currently effective is displayed in response to the change of the specification of the equipment.

To refer to or edit a conversion rule of an older version, pressing an edit button 911 corresponding to each data name in a column of the version management displays reference/edit information. The user performs various operations on the conversion rule version management screen 1001 of FIG. 10 which will be described later. The delete button 912 is an I/F for deleting a row of the conversion rule list 910.

Figure 10:
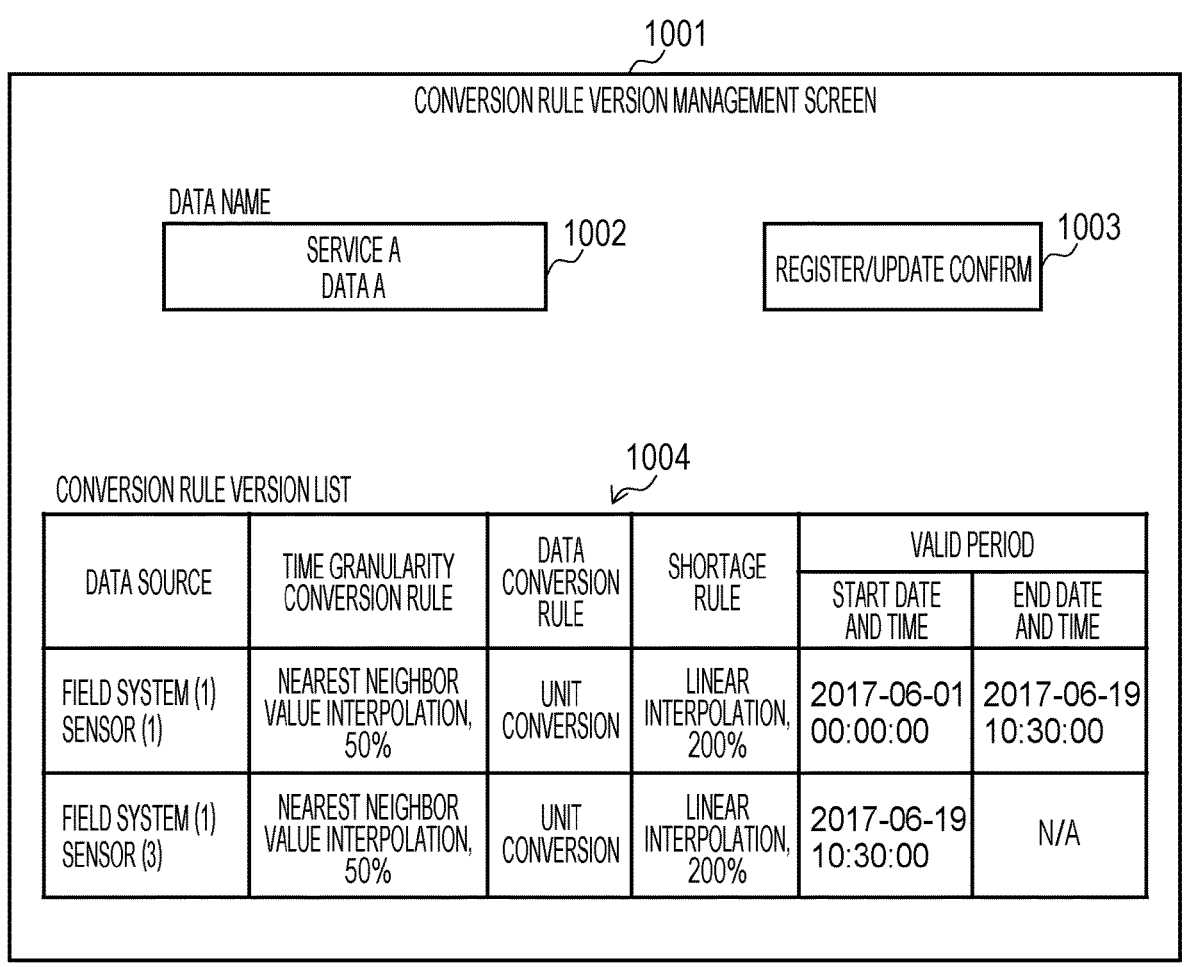
FIG. 10 is a conceptual diagram illustrating a configuration of a conversion rule version management screen according to an embodiment of the present invention.

FIG. 10 is a conceptual diagram illustrating a configuration of a conversion rule version management screen 1001 according to an embodiment of the present invention. This conversion rule version management screen 1001 is a user interface (display unit) used by the explanatory information setting terminal 101 to manage the versions of the conversion rules, and displays a data name selection area 1002, an enter button 1003 for confirming registration/update, and a conversion rule version list 1004.

The data name selection area 1002 displays a service data name selected by pressing an edit button 911 in FIG. 9, and the conversion rule version list 1004 displays a list of older, present, and future conversion rules about the selected service data. To confirm registration/update is to complete, declare, or report that the user has input information to be registered/updated to the computer.

The user directly edits a conversion rule and a valid period on the conversion rule version list 1004 and presses the register/update confirm button 1003 to confirm the edited content, that is, update various information managed in the conversion rule management table 117 (the time granularity conversion rule 503, the data conversion rule 504, the shortage rule 505, or the like of FIG. 5).

When the user desires to perform version management of a conversion rule of another field data, the user may select the name of the other field data in the data name selection area 1002, and a conversion rule of the selected service data is displayed in the conversion rule version list 1004.

Figure 11:
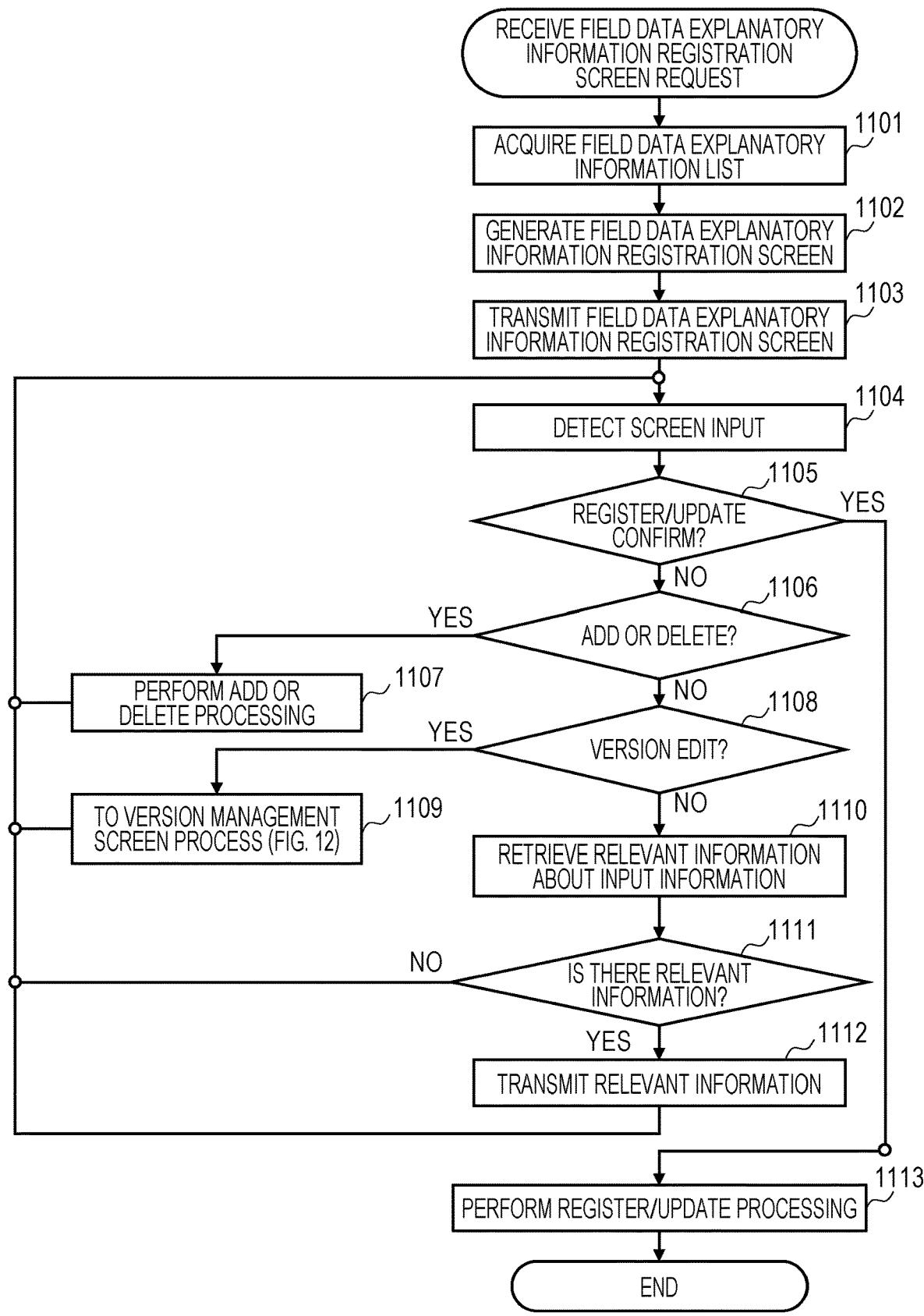
FIG. 11 is a flowchart illustrating a procedure of an explanatory information registration process according to an embodiment of the present invention.

Next, various processes of the data providing apparatus 103 illustrated in FIGS. 1 and 2 will be described with reference to FIGS. 11 to 15. FIG. 11 is a flowchart illustrating a process performed by the data providing apparatus 103 when the user registers field data or explanatory information of service data by using the explanatory information setting terminal 101.

Hereinafter, in this flowchart, a description will be given on a process of registering explanatory information of field data, but for a process of registering explanatory information of service data, the field data is replaced with the service data.

When the management screen generation unit 113 of the data providing apparatus 103 receives a field data explanatory information registration screen request for registering explanatory information from the explanatory information setting terminal 101 via the explanatory information access I/F 111, the management screen generation unit 113 requests a field data explanatory information list from the explanatory information management unit 114. Then, the management screen generation unit 113 acquires the field data explanatory information list held in the field data explanatory information management table 115, from the explanatory information management unit 114 (step 1101).

Next, the management screen generation unit 113 generates information of the field data explanatory information registration screen 601 on the basis of the acquired field data explanatory information list (step 1102), and transmits the information of the field data explanatory information registration screen 601 to the explanatory information setting terminal 101 via the explanatory information access I/F 111 (step 1103).

When the user performs a screen input operation on the field data explanatory information registration screen 601 by using the explanatory information setting terminal 101, screen input information is transmitted from the explanatory information setting terminal 101 to the data providing apparatus 103, and the management screen generation unit 113 detects the user's input to the screen (step 1104).

The management screen generation unit 113 confirms whether "register/update confirm" is input to the screen, that is, whether the register/update confirm button 603 of FIG. 6 is pressed (step 1105), and when the "register/update confirm" is input to the screen, the process proceeds to step 1113. When the "register/update confirm" is not input to the screen, the management screen generation unit 113 confirms whether "add or delete" is input, that is, whether the add button 605 or 609 or the delete button 607 or 611 of FIG. 6 is pressed (Step 1106).

When the "add or delete" is input to the screen, the management screen generation unit 113 creates information of a screen in which list information of the explanatory information input unit 612 of the field data explanatory information registration screen 601 is updated, according to the operation of the user, transmits the updated information of the screen to the explanatory information setting terminal 101 (step 1107), and waits for the user's input to the screen again.

In step 1106, when the "add or delete" is not input to the screen, the management screen generation unit 113 confirms whether "version edit" is input to the screen, that is, whether the edit button 613 of FIG. 6 is pressed (step 1108).

When "version edit" is input to the screen, the management screen generation unit 113 performs a version management screen process (step 1109) and waits for the user's input to the screen again. Detailed description of step 1109 will be made later with reference to FIG. 12.

In step 1108, when the "version edit" is not input to the screen by the user, the management screen generation unit 113 retrieves relevant information from the various management tables 115 to 117 on the basis of the input information input by the user (step 1110) to confirm whether there is the relevant information (step 1111).

When there is no relevant information, the management screen generation unit 113 waits for user's input to the screen while doing nothing, and when the relevant information is found, the management screen generation unit 113 updates the screen on the basis of the found relevant information and transmits the relevant information of the updated screen to the explanatory information setting terminal 101 (step 1112).

In a specific example, in steps 1110 to 1112, for example, when the user makes an input to the field table name selection unit 602 of FIG. 6, the management screen generation unit 113 acquires a data name list and an explanatory information list managed in a selected table from the field data explanatory information management table 115, and updates the screen to display the data name list in the data name selection unit 606 and displays the explanatory information list in the explanatory information input unit 612.

Furthermore, for example, when the user selects a cell of the explanatory information input unit 612 corresponding to explanatory information on a specific data name to register, the management screen generation unit 113 retrieves a data name similar to the selected data name in the field data explanatory information management table 115 or the service data explanatory information management table 116.

The management screen generation unit 113 acquires explanatory information on similar data from results of the retrieval and displays candidates on the explanatory information input unit 612, for input assistance to the user or automatically completes the explanatory information input unit 612. Finally, when the user inputs "register/update confirm" in step 1105, the management screen generation unit 113 passes a set of information updated by the user on the screen to the explanatory information registration unit 112, and registers or updates the field data explanatory information management table 115 (step 1113).

In this configuration, when receiving the input information including a data name 301 (or a data name 401) from the explanatory information setting terminal 101, the management screen generation unit 113 searches the field data explanatory information management table 115 or the service data explanatory information management table 116 on the basis of the received input information. The management screen generation unit 113 retrieves and extracts explanatory information similar to the input information. The management screen generation unit 113 transmits the extracted explanatory information as a candidate to the explanatory information setting terminal 101. The explanatory information setting terminal 101 displays the explanatory information as the candidate in the explanatory information input unit 612 of the field data explanatory information registration screen 601. Thus, the user using the explanatory information setting terminal 101 can register the information on the field data referring to the candidate.

Figure 12:
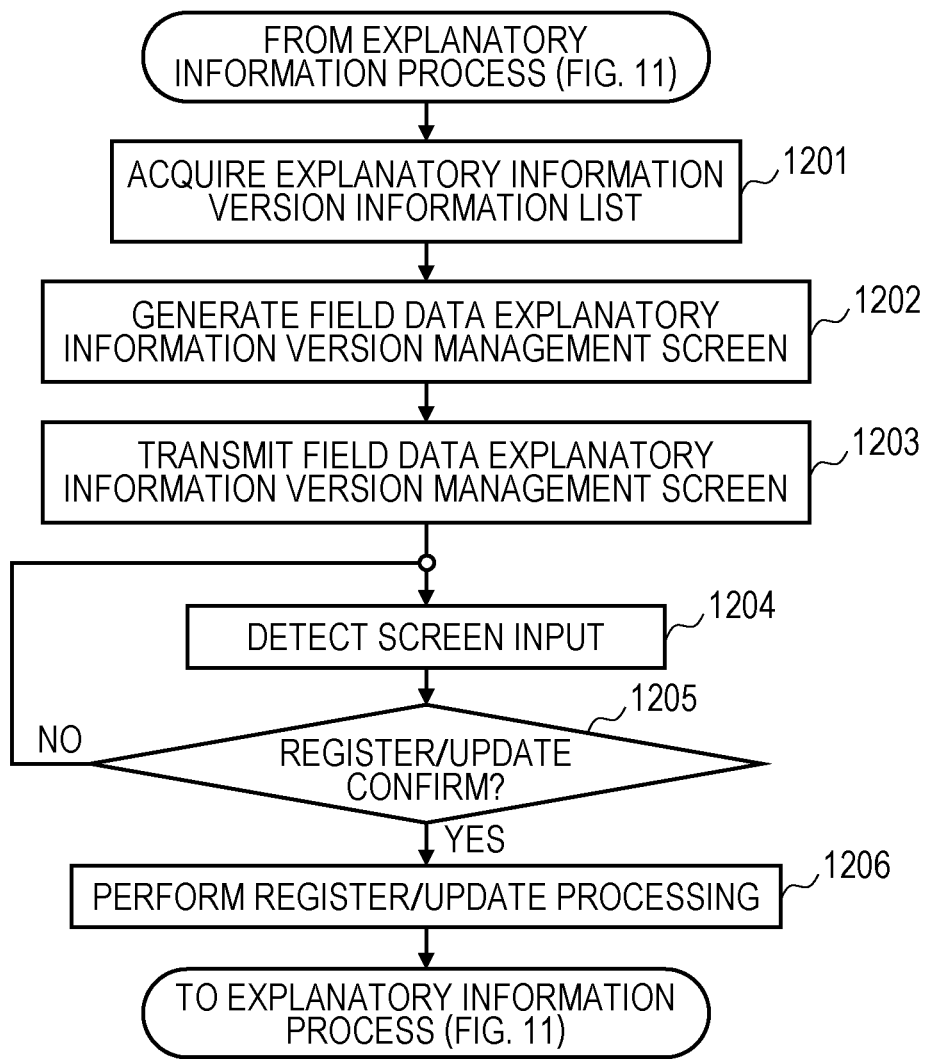
FIG. 12 is a flowchart illustrating a procedure of an explanatory information version management process according to an embodiment of the present invention.

FIG. 12 is a flowchart according to an embodiment of the present invention, which illustrates a process of the data providing apparatus 103 when the user edits version information of explanatory information of field data or service data by using the explanatory information setting terminal 101.

When the user requests "version edit", that is, presses the "edit" button 613 of FIG. 6, the management screen generation unit 113 acquires an explanatory information version information list on the corresponding data name from the field data explanatory information management table 115 (Step 1201). Next, the management screen generation unit 113 generates information of the field data explanatory information version management screen 701 on the basis of the acquired version information list (step 1202), and transmits the generated information of the screen to the explanatory information setting terminal 101 (step 1203).

When the user performs a screen input operation on the field data explanatory information version management screen 701 by using the explanatory information setting terminal 101, screen input information is transmitted from the explanatory information setting terminal 101 to the data providing apparatus 103, and the management screen generation unit 113 detects the user's input to the screen (step 1204).

The management screen generation unit 113 confirms whether "register/update confirm" is input to the screen by the user, that is, whether the register/update confirm button 703 of FIG. 7 is pressed (step 1205), and when the "register/update confirm" is not input, the management screen generation unit 113 waits for user's input again. When the "register/update confirm" is input, the management screen generation unit 113 passes a set of information updated by the user on the screen to the explanatory information registration unit 112, and registers or updates the field data explanatory information management table 115 (step 1206).

Figure 13:
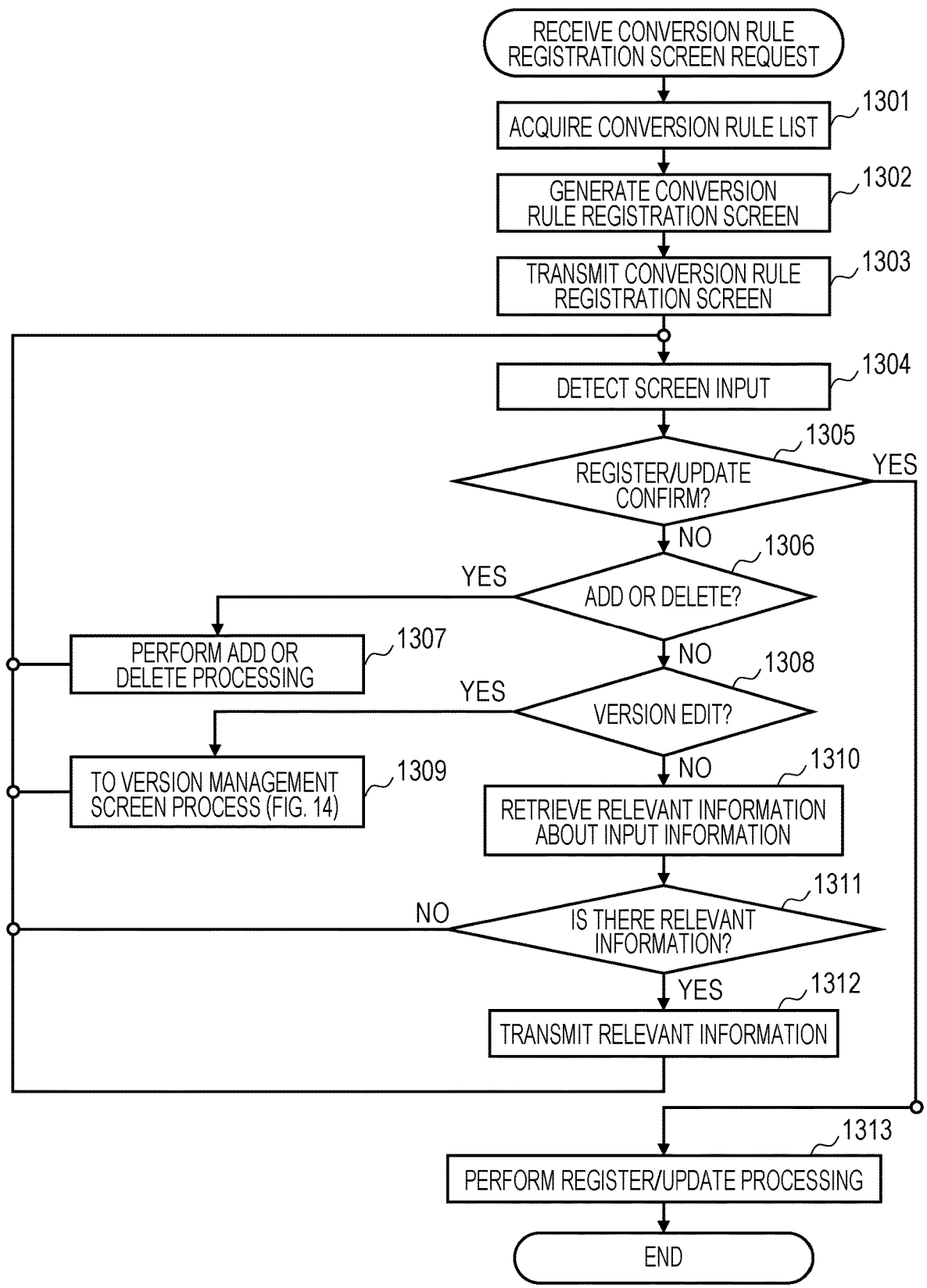
FIG. 13 is a flowchart illustrating a procedure of a conversion rule registration process according to an embodiment of the present invention.

FIG. 13 is a flowchart according to an embodiment of the present invention, which illustrates a process of the data providing apparatus 103 when the user registers a conversion rule by using the explanatory information setting terminal 101.

When the management screen generation unit 113 of the data providing apparatus 103 receives a conversion rule registration screen request for registering a conversion rule from the explanatory information setting terminal 101 via the explanatory information access I/F 111, the management screen generation unit 113 requests a conversion rule list from the explanatory information management unit 114. Then, the management screen generation unit 113 acquires the conversion rule list held in the conversion rule management table 117, from the explanatory information management unit 114 (step 1301).

Next, the management screen generation unit 113 generates information of the conversion rule registration screen 901 on the basis of the acquired conversion rule list (step 1302). Then, the management screen generation unit 113 transmits the generated information of the conversion rule registration screen 901 to the explanatory information setting terminal 101 via the explanatory information access I/F 111 (step 1303). The information of the conversion rule registration screen 901 is information for generating or creating the conversion rule registration screen 901.

When the user performs a screen input operation on the conversion rule registration screen 901 by using the explanatory information setting terminal 101, screen input information is transmitted from the explanatory information setting terminal 101 to the data providing apparatus 103, and the management screen generation unit 113 detects the user's input to the screen (step 1304).

The management screen generation unit 113 confirms whether "register/update confirm" is input to the screen, that is, whether the register/update confirm button 903 of FIG. 9 is pressed (step 1305), and when the "register/update confirm" is input, the process proceeds to step 1313.

Here, when the "register/update confirm" is not input to the screen, the management screen generation unit 113 confirms whether "add or delete" is input, that is, whether the add rule button 909 or the delete button 912 of FIG. 9 is pressed (Step 1306).

When the "add or delete" is input to the screen, the management screen generation unit 113 creates information of a screen in which list information on the conversion rule list 910 of the conversion rule registration screen 901 is updated, according to the operation of the user, transmits the updated information of the screen to the explanatory information setting terminal 101 (step 1307), and waits for the user's input to the screen again.

In step 1306, when the "add or delete" is not input to the screen, the management screen generation unit 113 confirms whether "version edit" is input to the screen, that is, whether the edit button 911 of FIG. 9 is pressed (step 1308).

When "version edit" is input to the screen, the management screen generation unit 113 performs a version management screen process (step 1309) and waits for the user's input to the screen again. Detailed description of step 1309 will be made later with reference to FIG. 14.

In step 1308, when the "version edit" is not input to the screen by the user, the management screen generation unit 113 retrieves relevant information from the various management tables 115 to 117 on the basis of the input information input by the user (step 1310) to confirm whether there is the relevant information (step 1311).

When there is no relevant information, the management screen generation unit 113 waits for user's input to the screen while doing nothing, and when the relevant information is found, the management screen generation unit 113 updates the information of the screen on the basis of the found relevant information and transmits the relevant information of the updated screen to the explanatory information setting terminal 101 (step 1312).

In a specific example, in steps 1310 to 1312, for example, when the user makes an input to the data name selection unit 904 of FIG. 9, a conversion rule previously registered relating to the same or similar data name to a selected data name is retrieved from the conversion rule management table 117, and acquired conversion rule information (data source or various rules) is displayed or automatically completed as a candidate, in the I/Fs of the data source selection unit 905 to the shortage rule selection unit 908 for input assistance to the user.

Note that when retrieving the relevant information, not only data name is used as a key, but also explanatory information on the data name may be used as a key. For example, even when data names are not similar to each other, when the data are similar to each other in explanatory information, the input data name is identified as similar to the found data name, and a conversion rule relating to the data may be also displayed as a candidate on the screen.

Finally, when the user inputs "register/update confirm" in step 1305, the management screen generation unit 113 passes a set of information updated by the user on the screen to the explanatory information registration unit 112. The explanatory information registration unit 112 registers or updates the conversion rule management table 117 (step 1313).

At this time, when receiving the input information including a data name 401 illustrated in FIG. 4 or a data name 301 illustrated in FIG. 3 from the explanatory information setting terminal 101, the management screen generation unit 113 illustrated in FIG. 1 or 2 searches the conversion rule management table 117 on the basis of the received input information, and extracts, from a plurality of conversion rules, a conversion rule identified by a data name 501 (or a data source 502) corresponding to the input information and registered in the conversion rule management table 117. Furthermore, the management screen generation unit 113 transmits information on the extracted conversion rule as a candidate to the explanatory information setting terminal 101. The explanatory information setting terminal 101 displays the information on the extracted conversion rule as a candidate in the conversion rule list 910 on the conversion rule registration screen 901. Thus, the user using the explanatory information setting terminal 101 can register a conversion rule with reference to a candidate.

Figure 14:
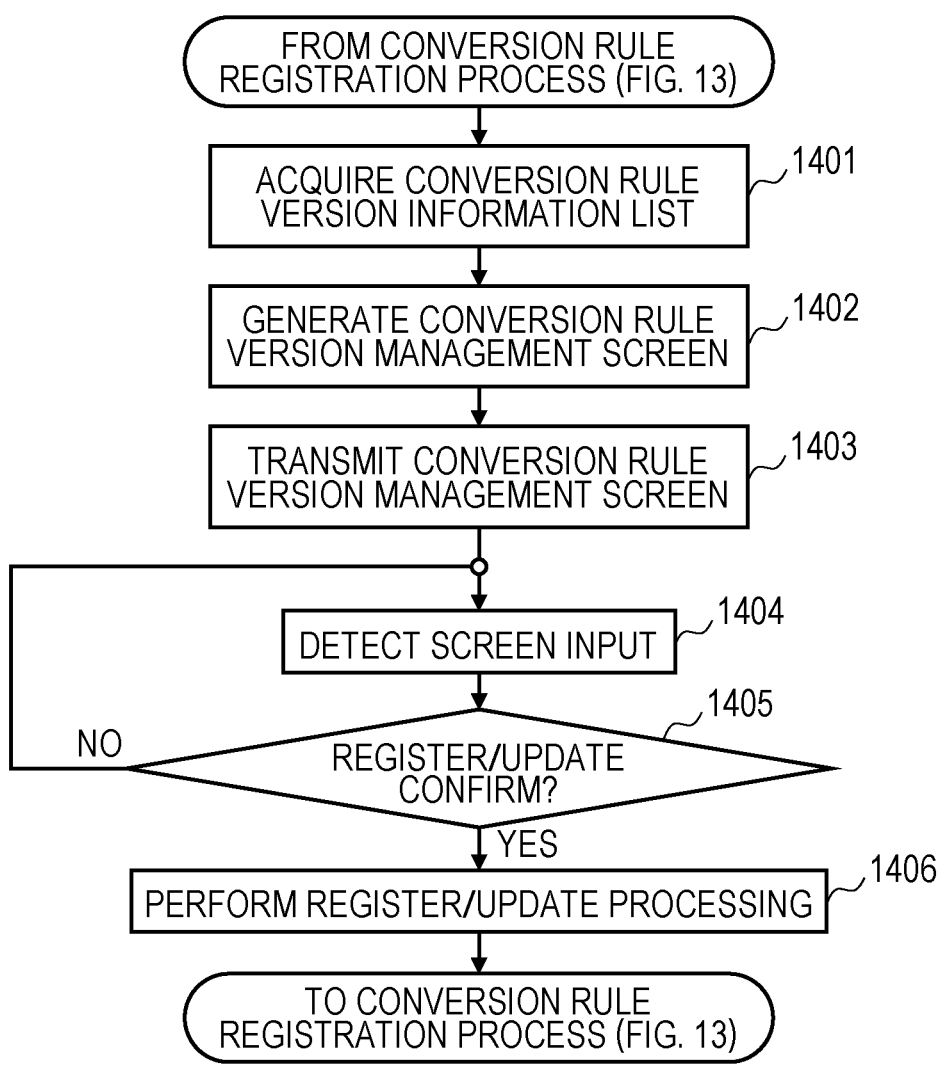
FIG. 14 is a flowchart illustrating a procedure of a conversion rule version management process according to an embodiment of the present invention.

FIG. 14 is a flowchart according to an embodiment of the present invention, which illustrates a process of the data providing apparatus 103 when the user edits version information on a conversion rule by using the explanatory information setting terminal 101.

When the user requests "version edit", that is, presses the "edit" button 911 of FIG. 9, the management screen generation unit 113 acquires a conversion rule version information list on the corresponding data name from the conversion rule management table 117 (Step 1401).

Next, the management screen generation unit 113 generates information of the conversion rule version management screen 1001 on the basis of the acquired version information list (step 1402), and transmits the generated screen information to the explanatory information setting terminal 101 (step 1403).

When the user performs a screen input operation on the conversion rule version management screen 1001 by using the explanatory information setting terminal 101, screen input information is transmitted from the explanatory information setting terminal 101 to the data providing apparatus 103, and the management screen generation unit 113 detects the user's input to the screen (step 1404).

The management screen generation unit 113 confirms whether "register/update confirm" is input to the screen by the user, that is, whether the register/update confirm button 1003 of FIG. 10 is pressed (step 1405), and when the "register/update confirm" is not input, the management screen generation unit 113 waits for user's input again.

When the "register/update confirm" is input, the management screen generation unit 113 passes a set of information updated by the user on the screen to the explanatory information registration unit 112. The explanatory information registration unit 112 registers or updates the conversion rule management table 117 (step 1406).

Figure 15:
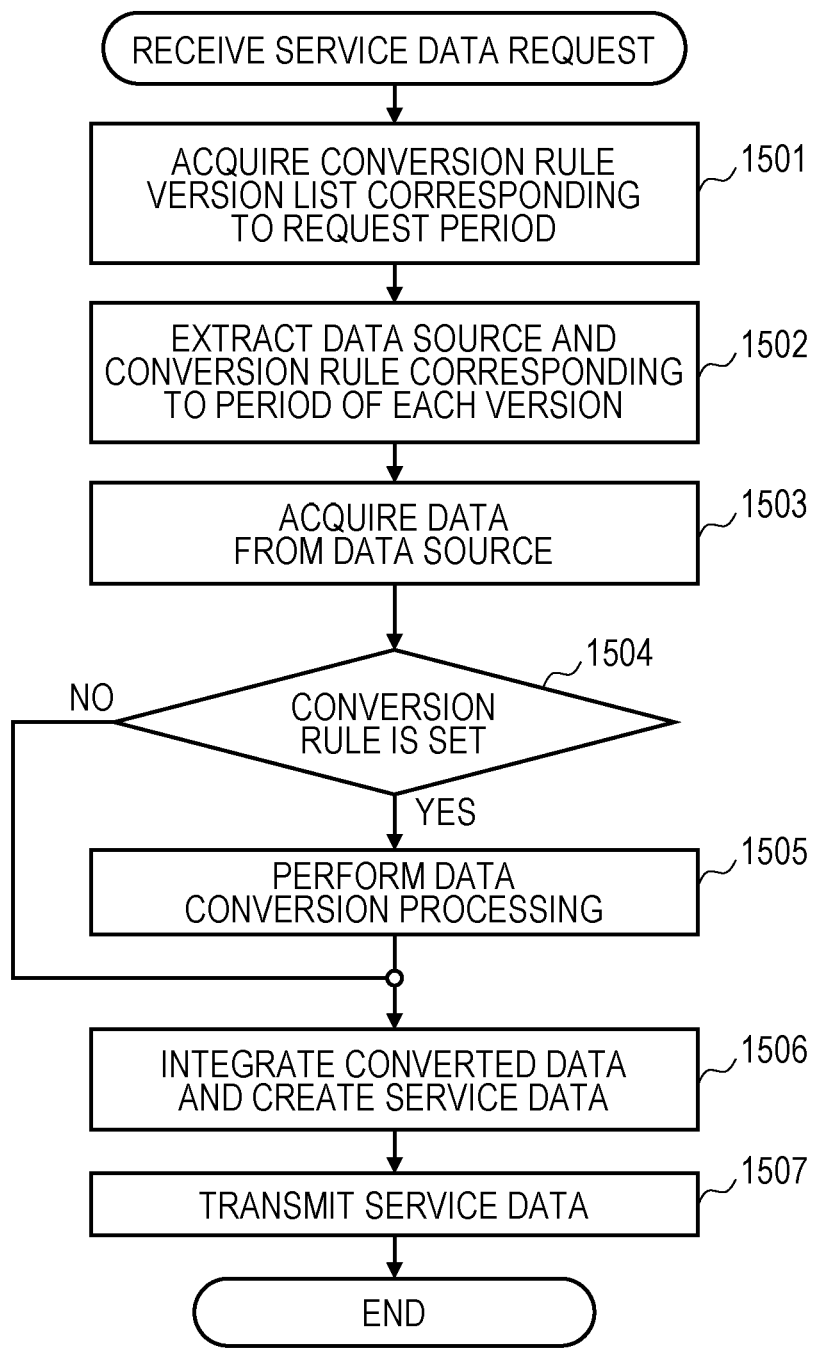
FIG. 15 is a flowchart illustrating a procedure of a service data acquisition process according to an embodiment of the present invention.

FIG. 15 is a flowchart according to an embodiment of the present invention, which illustrates a process of the data providing apparatus 103 when the service terminal 100 requests service data from the data providing apparatus 103.

When the data generation unit 105 of the data providing apparatus 103 receives a service data request via the data access I/F 104, the data generation unit 105 passes a table name, a data name (data name 401), and a request period of the service data included in the service data request to the explanatory information management unit 114. The explanatory information management unit 114 acquires from the conversion rule management table 117 a conversion rule version list relating to the service data and valid within the request period (step 1501). The conversion rule version list includes all information on data names 501 recorded in the conversion rule management table 117 and valid in the request period.

Next, the data generation unit 105 extracts, from all version information belonging to the acquired conversion rule version list, a data source (information recorded in the data source 502) corresponding to a valid period of each version and necessary to generate data of the valid period, and a conversion rule (information recorded in the time granularity conversion rule 503, the data conversion rule 504, and the information recorded in a shortage rule 505) (step 1502).

Then, the data generation unit 105 acquires necessary data from the data source for each valid period (step 1503). Here, the necessary data is, for example, field data in a field system identified by information recorded in the data source 502.

More specifically, the data generation unit 105 instructs the query generation unit 107 to generate a query for data acquisition, and the query execution control unit 108 executes the query generated by the query generation unit 107.

The query execution control unit 108 executes the query, and the data generation unit 105 acquires field data from the field system (1) 118 or the field system (2) 119 via the communication I/F 110 and the acquired data receiving unit 109.

For example, when the information on the data name 501 identified by the data name 401 is "service A data A", the query execution control unit 108 refers to the conversion rule management table 117 on the basis of the "service A data A", and acquires field data on the sensor (1) of the field system (1) 118 and field data on the sensor (3) of the field system (2) 119 from the field system (1) 118 and the field system (2) 119, respectively.

Next, the data generation unit 105 refers to information recorded in the conversion rule management table 117, and confirms whether various conversion rules (the time granularity conversion rule 503, the data conversion rule 504, and the shortage rule 505) need to be set to the data (field data) acquired from the field system (1) 118 and the field system (2) 119 (step 1504).

That is, on the basis of the data name 501 corresponding to the data name 401 included in the service data request, the data generation unit 105 refers to the information on the data name 501 (information of the service data explanatory information management table 116) and the information on the data source 502 (information of the field data explanatory information management table 115) corresponding to the data name 501, in the conversion rule management table 117. On the basis of a result of the reference, the data generation unit 105 determines whether there is a difference between the specifications of service data identified by the data name 501 (contents of explanatory information, such as the time granularity and the unit) and the specifications of field data identified by the data source 502 (the contents of explanatory information, such as the time granularity and the unit). Thereafter, under the condition that it is determined that there is a difference in at least part of the specifications of both the service data and the field data, the data generation unit 105 determines whether various conversion rules are set in the acquired data.

When there is no difference between the specifications of both the service data and the field data and no conversion rule is set, the process proceeds to step 1506.

When there is a difference between the specifications of both the service data and the field data and a conversion rule is set, the data generation unit 105 passes the data (the field data) before conversion and the conversion rule to the data conversion unit 106 and performs the data conversion processing (step 1505).

When the data conversion unit 106 completes necessary data conversion for all the data in the request period, the data generation unit 105 combines all data obtained by the data conversion, as data obtained by the data conversion, for each request period, and creates service data to be transmitted to the service terminal 100 (step 1506). Next, the data generation unit 105 transmits the created service data as the requested service data to the service terminal 100 (step 1507).

When no conversion rule is set in acquired data (field data) and there is no difference in the specifications of both (field data and service data), the data generation unit 105 directly uses the acquired data (field data) to create service data, and transmits the created service data as the requested service data to the service terminal 100.

Furthermore, when there is a difference in at least part of the specifications of both (field data and service data), the data generation unit 105 identifies a specification (for example, unit) which has a difference of the specifications of both, applies a conversion rule to the identified specification, and converts the acquired data to the service data according to the conversion rule (for example, unit conversion) having been applied to the identified specification.

Specifically, when "unit conversion" is applied as a conversion rule, a unit "K" of the "field system (1) sensor (1)" is converted to a unit "° C." of the "service A data A", and a value obtained by subtracting "273.15" from a value of field data of "field system (1) sensor (1)" is defined as service data of "service A data A". In addition, it is also possible to store and manage created service data in any management table or the storage device 204.

In other words, an example of the data integration system according to the above embodiments of the present invention includes a field data acquisition unit, a service providing unit, and a data providing unit. The field data acquisition unit is connected to equipment and acquires information on the equipment.

The data providing apparatus 103 includes information on a method of acquiring or generating field data by the field data acquisition unit, information on a method of using the acquired or generated field data by the service providing unit, and information on a rule for converting the information on a method of acquiring or generating field data to the information on a method of using the field data in response to a request from the service providing unit.

The data providing apparatus 103 receiving a request from the service providing unit compares information on the method of acquiring or generating field data with information on the method of using the field data, and changes a rule for conversion on the basis of a result of the comparison.

The data providing apparatus 103 acquires field data in response to the request from the service providing unit, changes the acquired field data on the basis of the changed rule, and transmits the changed field data to the service providing unit.

When the field data acquisition unit connected to the equipment is changed or updated, the information on the method of acquiring or generating field data can be updated. When the equipment is updated or changed, a difference is generated between the information on the method of acquiring or generating field data and the information on the method of using the field data.

The data acquisition unit may be a single sensor 120 connected to or installed in the equipment illustrated in FIG. 1 or a set of a sensor 120 and the controller 121. Furthermore, in some cases, the data acquisition unit may include the gateway 123 or the field data storage unit 122. In other words, the data acquisition unit is preferably a device for acquiring field data.

The sensor measures or detects temperature, humidity, angle, the presence and absence of an object, or the like, and outputs data as an analog value or in a predetermined format. A field system, for example, converts data acquired from the sensor into data necessary to control an actuator or an input/output port to which the field system is connected.

That is, the field system, for example, converts the data acquired from the sensor into data for controlling a device connected to the controller 121. Data output from the sensor and converted data may be stored in a storage unit in the controller 121 or may be stored in a storage unit different from the controller 121.

In a case where an imaging unit, such as a camera, is connected to the controller 121, a storage unit such as a storage may be provided separately. In addition to the controller 121, a storage unit or an auxiliary storage unit may be provided in the gateway 123 to store data. Alternatively, as illustrated in FIG. 1, the field data storage unit 122 commonly used between the gateway 123 and the controller 121 may be provided.

In contrast, data required by the service providing unit needs to be converted into data suitable for the service providing unit. That is, the service providing unit needs data different from the data for controlling a device connected to the controller 121 in the field system.

Therefore, the data providing apparatus 103 according to an embodiment of the present invention has the specification of field data on the field system side based on the information from the sensor or the like connected to the controller 121 of the field system and the specification of data required by the service providing unit. Therefore, it is possible to determine whether data to be provided to the service providing unit is to be converted into what type of data.

Furthermore, the data providing apparatus 103 is configured to convert field data to data required by the service providing unit and provides the data obtained by the conversion.

Furthermore, when a sensor connected to the controller 121 is replaced or updated and the sensor before replacement is different from a sensor after replacement in specification of data (for example, different in the unit), the data providing apparatus 103 compares the specification of field data of a field system with the specification of data required by the service providing unit, and changing of the sensor can be detected. Furthermore, after the detection, the data providing apparatus 103 knows the contents of the specifications of the field data of the field system, and conversion into data required by the service providing unit can be carried out.

As described above, even when part of the field system is replaced, the data providing apparatus 103 has information on both of the specification of field data of the field system and the specification of data required by the data providing apparatus 103, and compares the specifications with each other before and after the replacement. Thus, it is possible to carry out smooth conversion into data required by the service providing unit.

In the embodiments described above, even when data has a difference in granularity or accuracy requested between the field data collected and accumulated by each field system and the service (service data) using the field data, the data integration system converts and accommodates the difference. Therefore, even when there is a change in the specification of the field system, the service side (service terminal side) can provide a service without changing the setting of the service, that is, without modifying the service application, reducing a burden on service management when the field data is used.

According to the present embodiment, it is possible to provide service data matching a request from each service terminal as the data requestor to the service terminal, and as a result, it is possible to reduce the man-hours for revision of the service application in the service terminal.

Furthermore, when receiving a service data request including the request period from the service terminal, the data providing apparatus 103 compares the specification of service data with the specification of field data, and identifies field data having a difference in specification from the service data, converting the identified field data into service data specified in the service data request. Therefore, even when the specification of equipment in the field system is changed, it is possible to provide service data that does not require modification of the service application to the service terminal. By using information in the management table as information on a conversion rule, it is possible to provide service data, the specification of which matches the request period, to a service terminal.

Furthermore, the data providing apparatus 103 is configured to manage the management table for managing the service data and the field data for each version in accordance with the change of the specification of the equipment. Thus, even when the request period overlaps the valid period of a plurality of versions and the specification of equipment in the field system is changed a plurality of times within the request period, the service data that does not require modification of the service application is provided to the service terminal.

In addition, when receiving input information including the first identification information or the second identification information, the data providing apparatus 103 can extract a conversion rule identified by the third identification information or the fourth identification information corresponding to the input information and having been registered from a plurality of conversion rules, and transmits information on the extracted conversion rule as a candidate to the explanatory information setting terminal. Thus, in the explanatory information setting terminal, it is possible to set a conversion rule with reference to the candidate.

In the data providing apparatus 103, the field data can be converted to service data within the request period specified in the service data request so that the service data is provided to the service terminal. Thus, in each field system, even when equipment or a device is changed, the field data can be directly transmitted to the data providing apparatus 103, and the management cost of the field data in the field system can be cut.

In the present embodiment, a data flow based on data acquisition/request for acquiring and converting data from each field system on the basis of a data acquisition request from a service (service terminal) has been described. However, even when data is pushed from the field system to the data providing apparatus 103, a similar data conversion process can be applied.

For example, when the data providing apparatus 103 receives a data transmission notification (a notification to which a data name 301 and a request period is added) from the field system (1) 118, the data providing apparatus 103 acquires field data identified by second identification information (data name 401) corresponding to a data name 301 added to the data transmission notification within the request period specified in the data transmission notification from the field system (1) 118. Next, on the basis of the first identification information (the data name 301) added to the data transmission notification and the second identification information (the data name 401) corresponding to the first identification information, the data providing apparatus 103 refers to the field data explanatory information management table 115 and the service data explanatory information management table 116, and compares the specifications of the field data with the specification of the service data. Then, when there is a difference between the specification of the field data and the specification of the service data, the data providing apparatus 103 refers to the conversion rule management table 117 to convert the field data acquired into service data in accordance with a conversion rule within the request period specified in the data transmission notification, and manages the service data obtained by the conversion as service data to be used by a service terminal 100.

Thus, it is possible to hold service data requested from the service terminal 100 on the basis of a data transmission notification from the field system (1) 118, and immediately respond to the service data request from the service terminal 100. Note that the field system (1) 118 is configured to transmit the data transmission notification to the data providing apparatus 103 periodically or on condition that the equipment is changed (specification change).

It is to be understood that the above-described embodiments of the present invention are by way of examples for the purpose of description of the present invention, and the scope of the present invention is not limited to only those embodiments. Those skilled in the art can implement the present invention in various other modes without departing from the spirit and scope of the present invention. For example, the field data explanatory information management table 115, the service data explanatory information management table 116, and the conversion rule management table 117 may be integrated into a single management table so that the information of the management tables is managed in the single management table. Furthermore, the management table records information in which at least the specification of the field data and the specification of the service data are recorded and correlated with each other, and information on a conversion rule defining a relationship between the field data and the service data, and both information is an object to be retrieved by the data providing apparatus (host CPU 201) 103.

Furthermore, the data providing apparatus 103, the field system (1) 118, and the explanatory information setting terminal 101 may be configured as an equipment management system. At this time, the field system (1) 118 is a data collection unit for collecting data on the equipment, and the data providing apparatus 103 is a data providing unit for transmitting and receiving information to and from the data collection unit as a communication target.

The data providing unit (host CPU 201) has management tables (field data explanatory information management table 115, conversion rule management table 117) in which first information (field data name 301 before version change) and first change information (field data name 301 after version change) are registered in association with the specification of the equipment (explanatory information classification 302, explanatory information 303), and a plurality of conversion rules (time granularity conversion rule 503, data conversion rule 504, shortage rule 505) is registered. The first information manages first data (field data) collected by the data collection unit and generated before changing the equipment, the first change information manages first change data (field data) generated after changing the equipment, and the plurality of conversion rules converts the first change data into the first data.

The data providing unit reads the first information and the first change information and further the first data and the first change data from the data collection unit, extracts, from the plurality of conversion rules, a conversion rule to be applied to each of the read first data and first change data on the basis of the read first information and first change information, converts the read first change data into the first data on the basis of the extracted conversion rule, and registers the converted first data to the management tables.

Therefore, even when the equipment is changed, it is possible to convert data (first change data) which is changed with changing the equipment into the first data which corresponds to the data before changing the equipment.

Furthermore, in a case where the explanatory information setting terminal 101 having a display unit (601, 701, 801, 901, 1001) for displaying information from the data providing unit is further provided as a unit belonging to the communication target to the data providing unit, the display unit may display the first change information (FIG. 6). In addition, the display unit may display information (FIG. 7) indicating that the first change information is read into the data providing unit after the first information is read or may display the first change information. Furthermore, the display unit may display that the first change information has a value obtained after the equipment is changed (FIG. 10) or may display information on a conversion rule specified by the data providing unit (FIGS. 9 and 10). Thus, it is possible to present information changed with the change of the equipment to the user.

Furthermore, when receiving a service data request (data acquisition request) from the service terminal 100, the data providing unit (host CPU 201) acquires field data specified in the service data request from the field data management terminal (118), compares a specification of the field data with a specification of the service data by referring to the management table on the basis of the acquired field data (step 1504), converts the acquired field data into service data according to the conversion rule when there is a difference between the specification of the field data and the specification of the service data (step 1505), and transmits the service data obtained by the conversion as service data requested in the service data request to the service terminal 100 (step 1507).

Therefore, even when the specification of equipment in the field system is changed, it is possible to provide service data that does not require modification of the service application to the service terminal.

What is claimed is:

1. A data providing apparatus comprising:
   a field data acquisition unit configured to acquire field data relating to field equipment, and a data providing unit configured to transmit and receive information to and from a service providing unit, the service providing unit being a communication target and configured to use the field data as service data,
   wherein the data providing unit
   manages information on a conversion rule defining a relationship between the field data and the service data, acquires the field data specified in a data acquisition request from the service providing unit, from the field data acquisition unit, compares a specification of the field data acquired with a specification of the service data, converts the acquired field data according to the conversion rule when there is a difference between the compared specification of the field data and specification of the service data, and transmits the converted field data to the service providing unit;
   wherein the information on the conversion rule includes:
   a field data management table configured to manage first identification information for identifying the field data and first specification information on the specification of the field data, in association with a valid period of the first identification information and the first specification information;
   a service data management table configured to manage second identification information for identifying the service data and second specification information on the specification of the service data, in association with a valid period of the second identification information and the second specification information; and
   a conversion rule management table configured to manage third identification information for identifying the field data and fourth identification information for identifying the service data, in association with each other, and manage the conversion rule in association with a valid period of the conversion rule,
   wherein the data providing unit,
   when receiving a data acquisition request including the second identification information and a request period, as the data acquisition request from the service providing unit, acquires from the field data acquisition unit, field data identified in first identification information corresponding to the second identification information added to the data acquisition request received, within the request period added to the data acquisition request, compares a specification of the field data with a specification of the service data by referring to the field data management table and the service data management table, on the basis of the second identification information added to the data acquisition request, and converts the field data acquired to service data in accordance with a conversion rule within the request period added in the data acquisition request by referring to the conversion rule management table, when there is a difference between the compared specification of the field data and specification of the service data.

2. The data providing apparatus according to claim 1, wherein
   the data providing unit,
   when receiving a data transmission notification including the first identification information and a request period from the field data acquisition unit, acquires field data specified in the first identification information added to the data transmission notification, within the request period added to the data transmission notification, from the field data acquisition unit, compares a specification of the field data with a specification of the service data by referring to the field data management table and the service data management table on the basis of the first identification information added to the data transmission notification and second identification information corresponding to the first identification information, converts the field data acquired into service data in accordance with a conversion rule within the request period added to the data transmission notification, by referring to the conversion rule management table when there is a difference between the compared specification of the field data and specification of the service data, and manages the service data obtained by the conversion as service data used by the service providing unit.

3. The data providing apparatus according to claim 1, wherein
   the data providing unit
   when receiving input information including the first identification information or the second identification information from an explanatory information setting unit belonging to the communication target, searches the conversion rule management table on the basis of the input information received, extracts, from a plurality of conversion rule, a conversion rule identified in the third identification information or the fourth identification information corresponding to the input information and having been registered in the conversion rule management tables, and transmits information on the extracted conversion rule as a candidate to the explanatory information setting unit.

4. The data providing apparatus according to claim 1, wherein
information registered in each of the service data management table, the field data management table, and the conversion rule management table is managed for each version in association with the valid period.

5. A data providing method in a data providing apparatus including a field data acquisition unit configured to acquire field data relating to field equipment, and a data providing unit configured to transmit and receive information to and from a service providing unit, the service providing unit being a communication target and configured to use the field data as service data, the method comprising:
managing information of a conversion rule defining a relationship between the field data and the service data by using the data providing unit;
acquiring, from the field data acquisition unit, field data specified in a data acquisition request received from the service providing unit by using the data providing unit;
comparing a specification of the field data acquired in the acquiring with a specification of the service data by using the data providing unit;
converting the field data acquired in accordance with the conversion rule by using the data providing unit, when there is a difference between a specification of the field data and a specification of the service data, as a result of the comparison in the comparing; and
transmitting data converted in the converting to the service providing unit by using the data providing unit;
wherein the information on the conversion rule includes:
a field data management table configured to manage first identification information for identifying the field data and first specification information on the specification of the field data, in association with a valid period of the first identification information and the first specification information;
a service data management table configured to manage second identification information for identifying the service data and second specification information on the specification of the service data, in association with a valid period of the second identification information and the second specification information; and
a conversion rule management table configured to manage third identification information for identifying the field data and fourth identification information for identifying the service data, in association with each other, and manage the conversion rule in association with a valid period of the conversion rule; and
wherein the data providing unit,
when receiving a data acquisition request including the second identification information and a request period, as the data acquisition request from the service providing unit, acquires from the field data acquisition unit, field data identified in first identification information corresponding to the second identification information received, within the request period added to the data acquisition request, in the acquiring,
compares a specification of the field data with a specification of the service data by referring to the field data management table and the service data management table, on the basis of the second identification information added to the data acquisition request, in the comparing, and
converts the field data acquired into service data in accordance with a conversion rule within the request period added in the data acquisition request by referring to the conversion rule management table, when there is a difference between a specification of the field data and a specification of the service data, in the converting.

6. The data providing method according to claim 5, wherein
the data acquisition unit,
in the acquiring,
when receiving a data transmission notification including the first identification information and a request period from the field data acquisition unit, acquires field data specified in the first identification information added to the data transmission notification, within the request period added to the data transmission notification, from the field data acquisition unit,
in the comparing,
compares a specification of the field data with a specification of the service data by referring to the field data management table and the service data management table on the basis of the first identification information added to the data transmission notification and second identification information corresponding to the first identification information, and
in the converting,
converts the field data acquired into service data in accordance with a conversion rule within the request period specified in the data transmission notification, by referring to the conversion rule management table, when there is a difference between the compared specification of the field data and specification of the service data as a result of comparison in the comparing, and manages the service data obtained by the conversion as service data used by the service providing unit.

7. The data providing method according to claim 5, further comprising
when receiving input information including the first identification information or the second identification information from an explanatory information setting unit belonging to the communication target, the data providing unit searching the conversion rule management table on the basis of the input information received, extracting, from a plurality of conversion rule, a conversion rule identified in the third identification information or the fourth identification information corresponding to the received input information and having been registered in the conversion rule management tables, and transmitting information on the extracted conversion rule as a candidate to the explanatory information setting unit.

8. The data providing method according to claim 5, wherein
information registered in each of the service data management table, the field data management table, and the conversion rule management table is managed for each version in association with the valid period.

* * * * *